April 26, 1960

A. SNIJDERS 2,934,603

ELECTRONIC RELAY AND THE CONTROL OF ARRANGEMENTS THEREWITH

Filed July 25, 1952

INVENTOR:
ANTONIE SNIJDERS.
BY
Hugh A Kirk
ATTY.

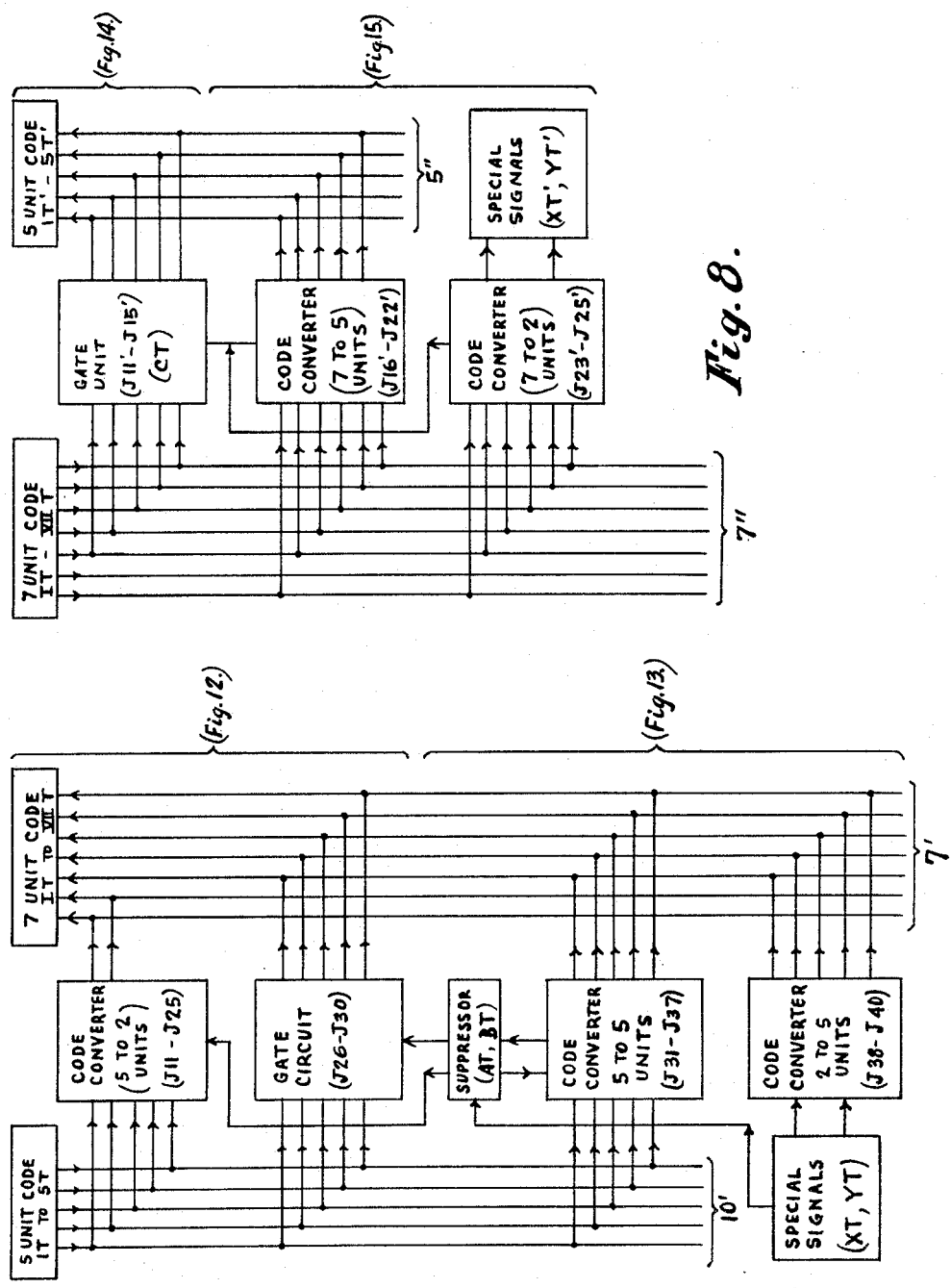

INVENTOR:
ANTONIE SNIJDERS.

United States Patent Office
2,934,603
Patented Apr. 26, 1960

2,934,603

ELECTRONIC RELAY AND THE CONTROL OF ARRANGEMENTS THEREWITH

Antonie Snijders, The Hague, Netherlands, assignor to De Staat der Nederlanden, Ten Deze Vertegenwoordigd Door de Directeur-Generaal der Posterijen, Telegrafie en Telefonie, The Hague, Netherlands Application July 25, 1952, Serial No. 300,817

24 Claims. (Cl. 178—26)

This invention relates to an arrangement of unidirectional resistors in an electrical circuit for affecting a potential between two points. More particularly, it deals with a unit of such an arrangement acting similarly to an electromagnetic polarized relay and herein called an electronic relay cell means, and also with combinations of a plurality of such electronic relay cells or means in a system with trigger circuits. These systems also include arrangements of the electronic relay cell means in matrices to form static binary code converter systems for the conversion of one binary code into another, the signals of each of which codes are composed of a plurality of binary elements or pulses and at least one of which codes is composed of signals all of which have the same ratio of the two different types of elements in that code. For example, such a system includes a fully electronic static code converter for a five (mark and space) element telegraph code into a seven (mark and space) element code in which each seven element signal has a constant ratio of marks and spaces. Such a conversion has advantages in automatic telegraph over radio (TOR) systems for automatically testing or checking the correct reception of signals transmitted between two stations.

This invention is a continuation-in-part of Snijders copending parent application Serial No. 35,403, filed June 26, 1948, now U.S. Patent No. 2,620,395, and also of Snijders co-pending divisional application Serial No. 188,658, filed October 6, 1950, now abandoned.

The parent Snijders Patent No. 2,620,395 is directed specifically to a code converter system in which one multi-element code is converted into another multi-element code having a constant ratio of marks and spaces by means of a plurality of matrices connected together through a plurality of unilateral electronic relay type cells, which cells comprise rectifiers only at their outputs in one of the matrices while employing linear resistances at their inputs in the other matrices thereby permitting relative large potential and current variations in these cells which could damage the rectifiers. However, the reduction of the number of rectifiers by using these linear resistances reduces the cost of the system.

The divisional Snijders application Serial No. 188,658, however, discloses the system in said patent directed specifically to unidirectional resistances arranged as multilateral electronic relay cells, by replacing the five resistances connected to each of the unilateral relay type cells of said patent with five rectifiers and one resistance so that rectifiers are employed in all of the matrices of the code converter system. This multi-rectifier system, however, is not as economical as that disclosed in said Snijders patent, although the multi-lateral relay cells employed therein have advantages over the unilateral relay cells of said patent.

It is an object of this invention to produce an efficient, effective, economic and simple electronic relay cell means which acts as an electromagnetic polarized relay but has no moving parts, is not subject to the inversion time of a moving armature, is more versatile and may control an infinite number of "contacts" or connections.

Another object is to produce such an electronic relay cell which is static, contains no vacuum tubes, has a low internal impedance, is side stable, does not require a constant current, and prevents high current at its output.

Another object is to produce such an electronic relay cell means which has a low input impedance and a high output impedance and an internal impedance between that of the input and the output so that a large amount of current is prevented from occurring at the output and thereby preventing damage to the unidirectional resistances or rectifiers of the cell means.

Another object is to produce such an electronic relay cell means for effecting, affecting and/or controlling the potential between two points in a circuit.

Another object is to produce such an electronic relay cell which may be connected in series or alternately in series with specific trigger circuits so as to be responsive to different potential levels.

Another object is to produce a specific trigger type circuit for employment with the electronic relay cells of this invention to provide substantially constant potential supplies for these cells, which trigger circuits are not affected by large changes in potential and may be considered to correspond to the coils of electromagnetic polarized relays.

Another object is to produce such electronic relay cells which may be connected and multipled together in cascade, and/or in series, to form pyramidal and/or rectangular matrices so as to reduce the number of rectifiers in a static code converter circuit.

Another object is to produce an efficient, effective, simple, economic, static and fully electronic code converter system comprising a plurality of matrices and such electronic relay cell means for converting a multi-element binary code signal into another multi-element binary code signal, at least one of which codes has a constant ratio of the two different types of elements.

Another object is to produce such a code converter system which first converts the code into an intermediate code of signals each having elements corresponding to the number of signals in the code, and then converting this intermediate code into the desired code to be produced.

Another object is to provide such a code converter system in which the signals of multi-element codes to be converted are first detected, selected and/or divided into groups of signals according to the similarity of their elements and then each of these groups of similar signals are separately converted into intermediate codes which then are combined into the desired code, whereby the number of rectifiers employed in such a system is materially reduced over those required in the above mentioned co-pending Snijders patent and application.

Another object is to produce such a code converter system in which multi-element signals of one code which are related to the multi-element signals of another code are detected and passed without conversion of all of their elements so that only some of the signals which are not so related need to be converted in order to reduce the number of rectifiers required over those disclosed in the above mentioned co-pending Snijders patent and application.

Another object is to produce such a code converter system comprising asymmetric pyramidal matrices composed of rectangular rectifier matrices and electronic relay cells.

Another object is to produce such automatic fully electronic code converter systems for automatic telegraph systems, telegraph over radio systems, repeaters, routing and railroad systems, and for operating trigger circuits, etc.

Another object is to produce such a code converter system in which the number of elements and rectifiers employed therein may be mathematically calculated according to known equations of variations, permutations, combinations and determinants of the number of elements in each signal and the number of signals in each of the codes to be converted.

Another object is to produce such a code converter circuit in which special code signals may be added which may be separately detected and may be combined with the new code being produced.

Generally speaking, this invention is based upon a circuit arrangement of unidirectional resistances for affecting a potential between two points, which arrangement is herein called an electron relay cell means in that it operates like an electromagnetic polarized relay without having many of the disadvantages of such an electromechanical relay. The electronic relay cell comprises an input and an output at the two points between which the potential is to be affected and requires that the input have a lower impedance than that of the output. Between the input and the output of the relay cell means is a conductor having at least two opposing non-linear or uni-directional resistances such as rectifiers therealong with a junction between them. These uni-directional resistances may either be directed conductively toward or away from each other or said junction, and there may also be provided an additional potential source connected to the junction through an impedance lower than that of the output but may be greater than that of the input, as well as additional uni-directional resistances connected from the junction to other inputs and/or outputs. It is necessary, however, that the uni-directional resistances or rectifiers of the electronic relay cell means all be conductive in the same direction with respect to the junction.

It has been found desirable to employ special switching devices such as trigger type or flip-flop circuits at the inputs and the outputs of the electronic relay cell means of this invention, which trigger circuits comprise a pair of cross connected electron tubes with a pair of proportional voltage dividers connected to the outputs of each of the tubes, as well as circuit arrangements for stabilizing the voltages of these trigger circuits if more than one is employed in the system.

A plurality of these electron relay cell means may be arranged in a system or in series including arrangement in matrices in either pyramidal matrices, rectangular matrices, or both, symmetrical or unsymmetrical, provided the impedances of their input and output circuits are properly matched. Not only may the electron relay cells be arranged in series one with another, but the rectifiers for controlling the junction of the cell or the output of a cell may also be controlled through more than one unidirectional resistance in series with each other and conductive in the same direction as the first unidirectional resistance connected to said cell junction. Thus, additional or external junctions between rectifiers may be employed for controlling or affecting the potential applied to the central or internal junction and/or output of an electronic relay cell means of this invention.

In a matrix arrangement of these electronic relay cells, a fully electronic static code converter system may be produced and the number of unidirectional resistances or rectifiers in the relay cells may be calculated according to mathematical theory of variations, permutations, combinations, and determinants according to the number of signals in each binary multi-element code. The code converter systems may be of several types.

One such system converts all the signals of the code to be converted into another or intermediate code having signals with the same number of elements as it has signals thereby having a constant ratio of marks and spaces in each signal, and then this intermediate code may be further converted into a desired code, and the conductors of the matrix corresponding to each of the signals of the intermediate code may comprise the junctions of separate electronic relay cell means. This code converter system employs a plurality of matrices and a large number of rectifiers.

Another code converter system in which the number of rectifiers may be reduced comprises detecting the signals of the code to be converted which have elements that are directly related to the elements in the signals of the desired or final code, and passing these signals through the system without conversion, and only converting the signals which are not so dependent.

Still another code converter system in which the number of rectifiers can still further be reduced comprises dividing the elements of the code to be converted into codes of only two or three elements per signal and converting each of these codes and then combining them into the final code.

Each one of these different systems involves rectifier matrices including the electronic relay cell means of this invention. In the latter two systems both the system input and output circuits for each element of the codes, as well as special gate circuits for controlling the conversion of certain groups of the signals comprise trigger circuits of the type described above.

If the desired or final code has more possible permutations and combinations of signal elements and therefore more signals than that of the code being converted, special signals may be provided for the additional signal combinations in the final code, which may be determined through electron relay cells of a separate rectifier matrix and an additional gate circuit to cause the blocking off of the regular signals of the code when one of the special signals is being produced in the final code.

The above mentioned and other features and objects of this invention and the manner of attaining them are given more specific disclosure in the following description of embodiments of the invention taken in conjunction with the accompanying drawings, wherein.

Figure 2:
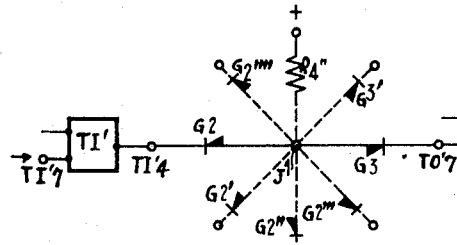
Fig. 2 is a schematic wiring diagram of a multi-lateral electronic relay cell according to the Snijders divisional U.S. application Serial No. 188,658, now abandoned, of which the present invention is a continuation.
Figure 4:
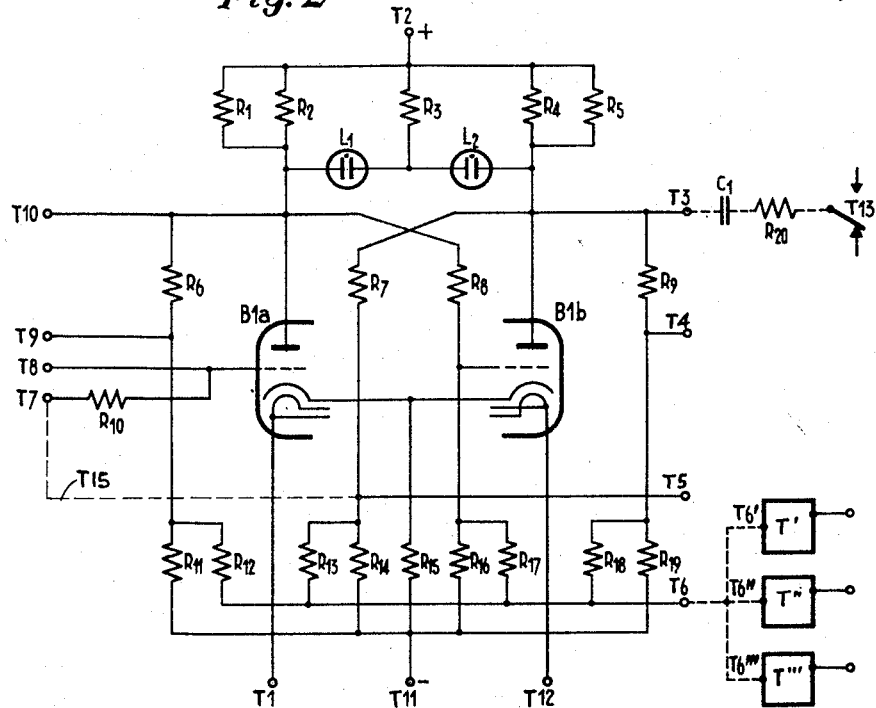
Fig. 4 is a schematic wiring diagram of a standard trigger or flip-flop circuit which may be employed for controlling the inputs and outputs of the electronic relay cells of this invention, as are shown in boxes in Figs. 1, 2, 3, 12, 13, 14, 15, 16 and 17.
Figure 5:
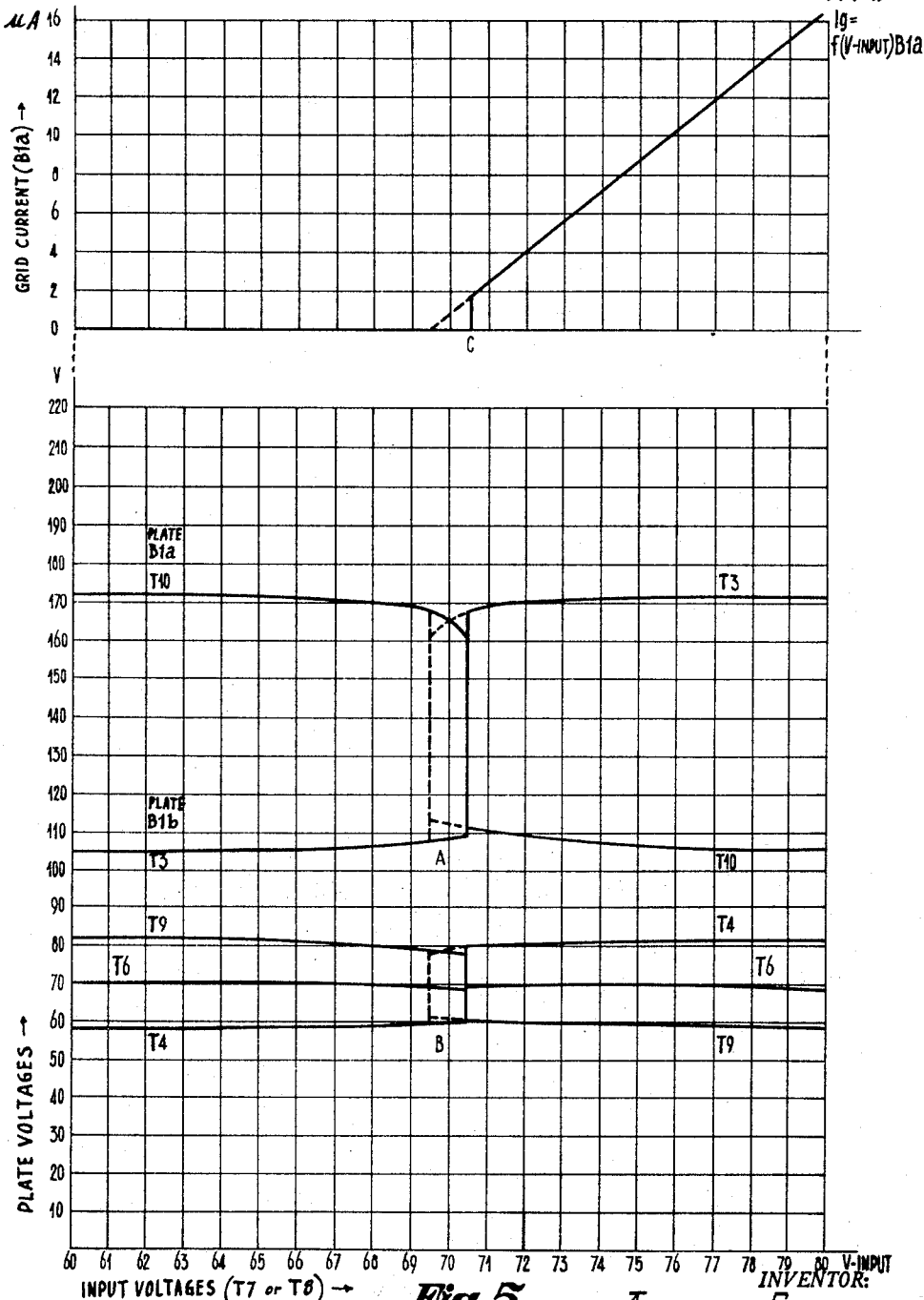
Figure 6:
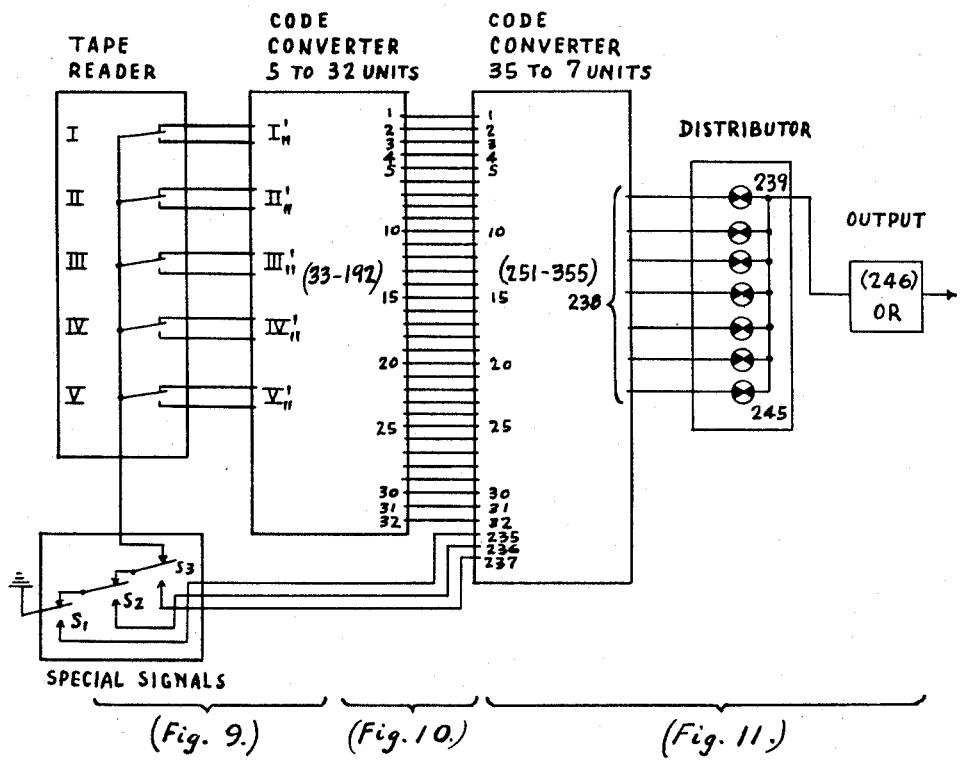
Figure 9:
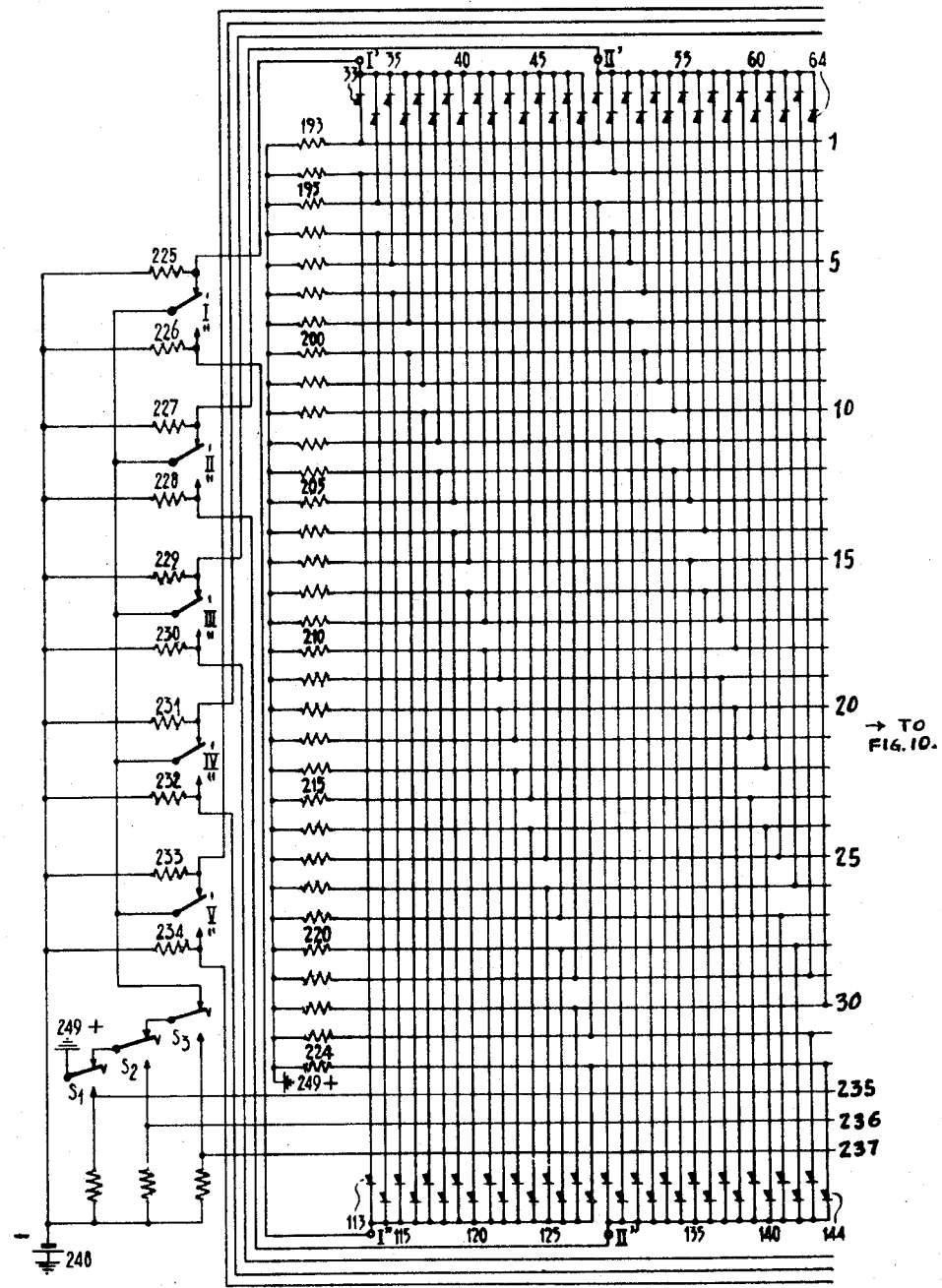
Figure 10:
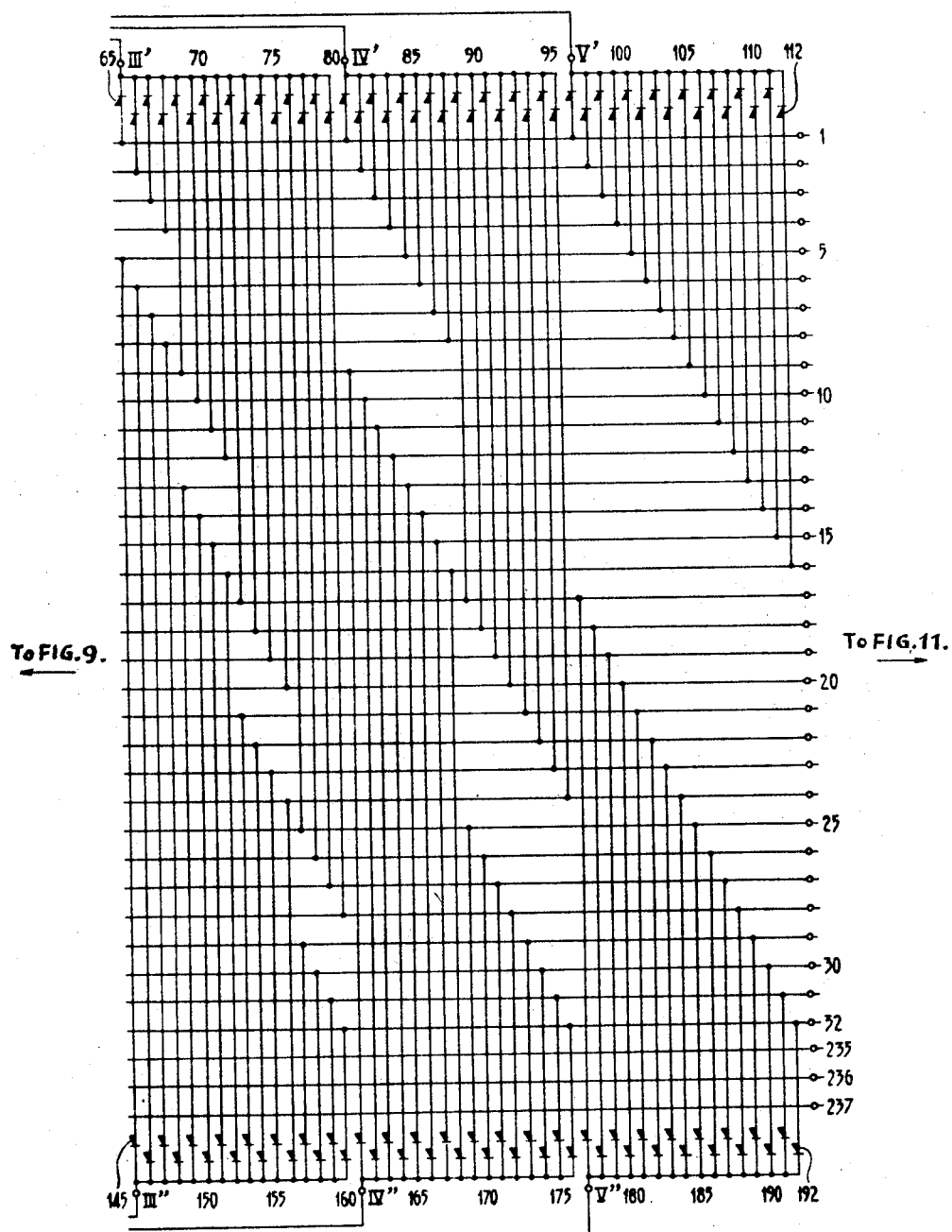
Figure 11:
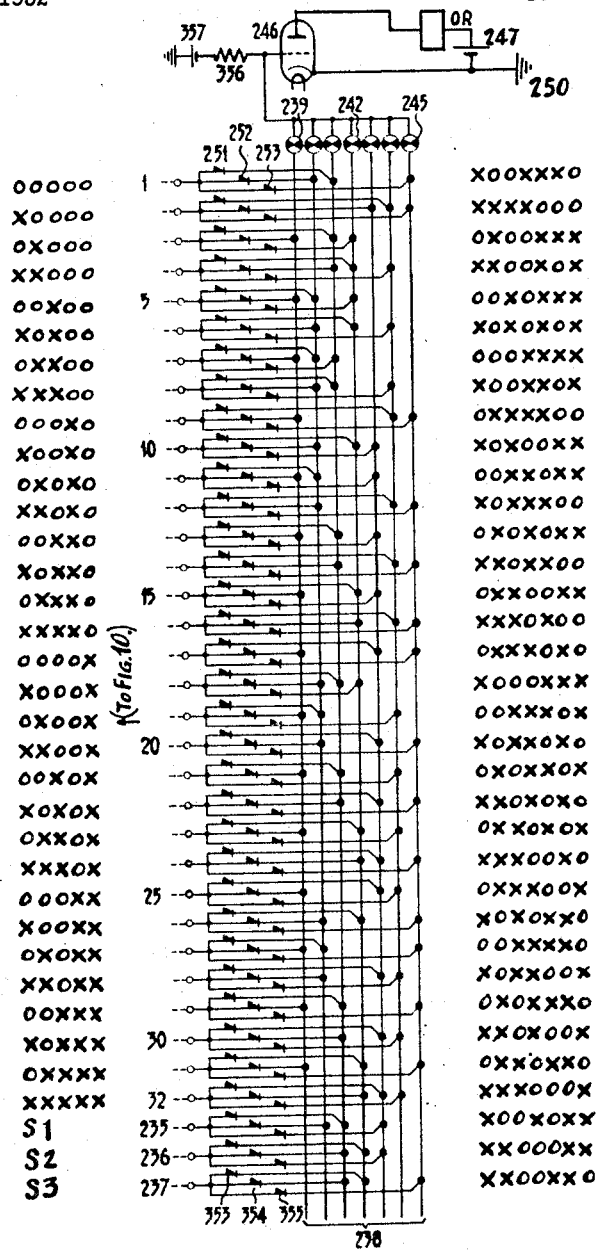
Figure 12:
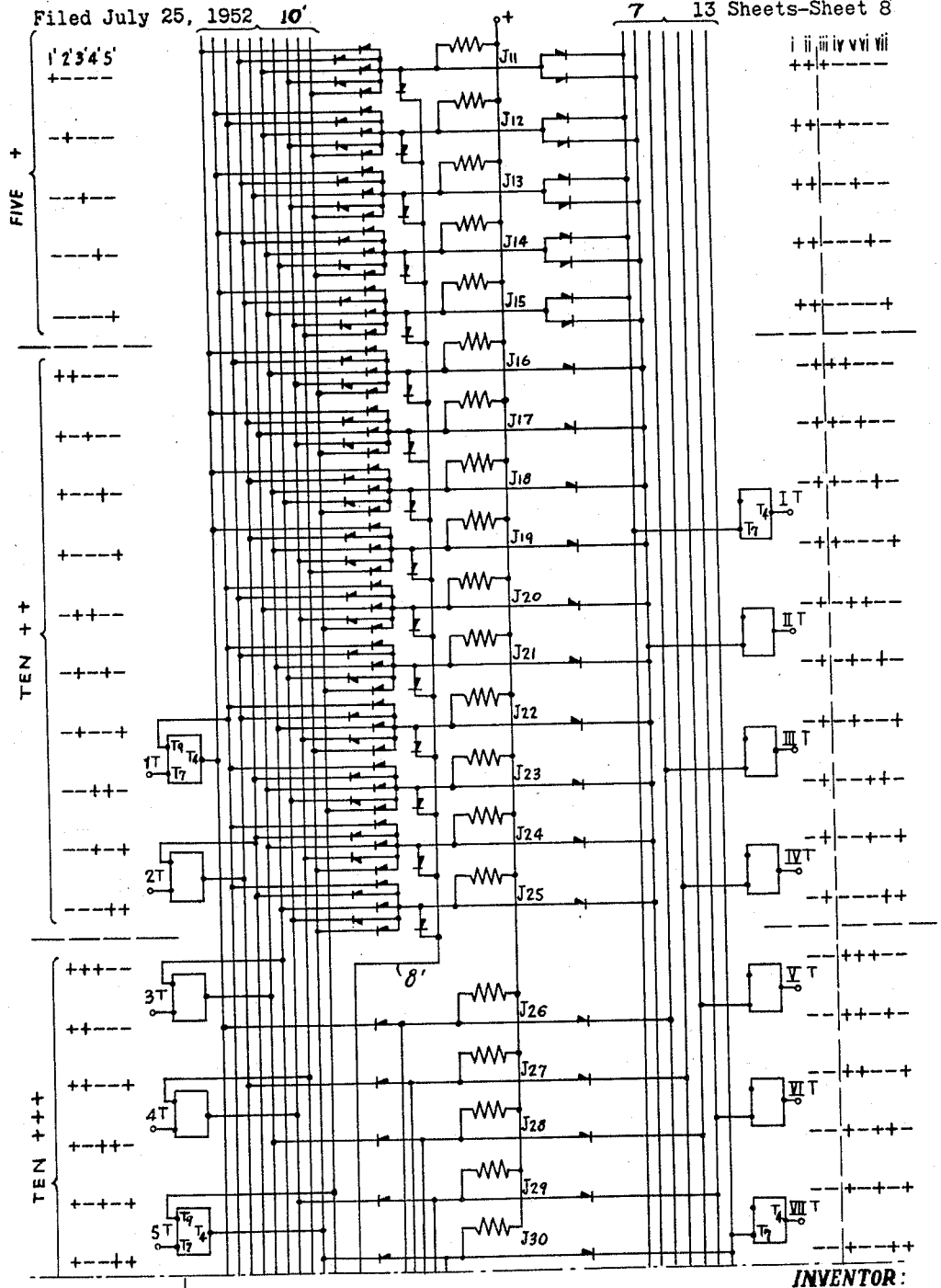
Figure 13:
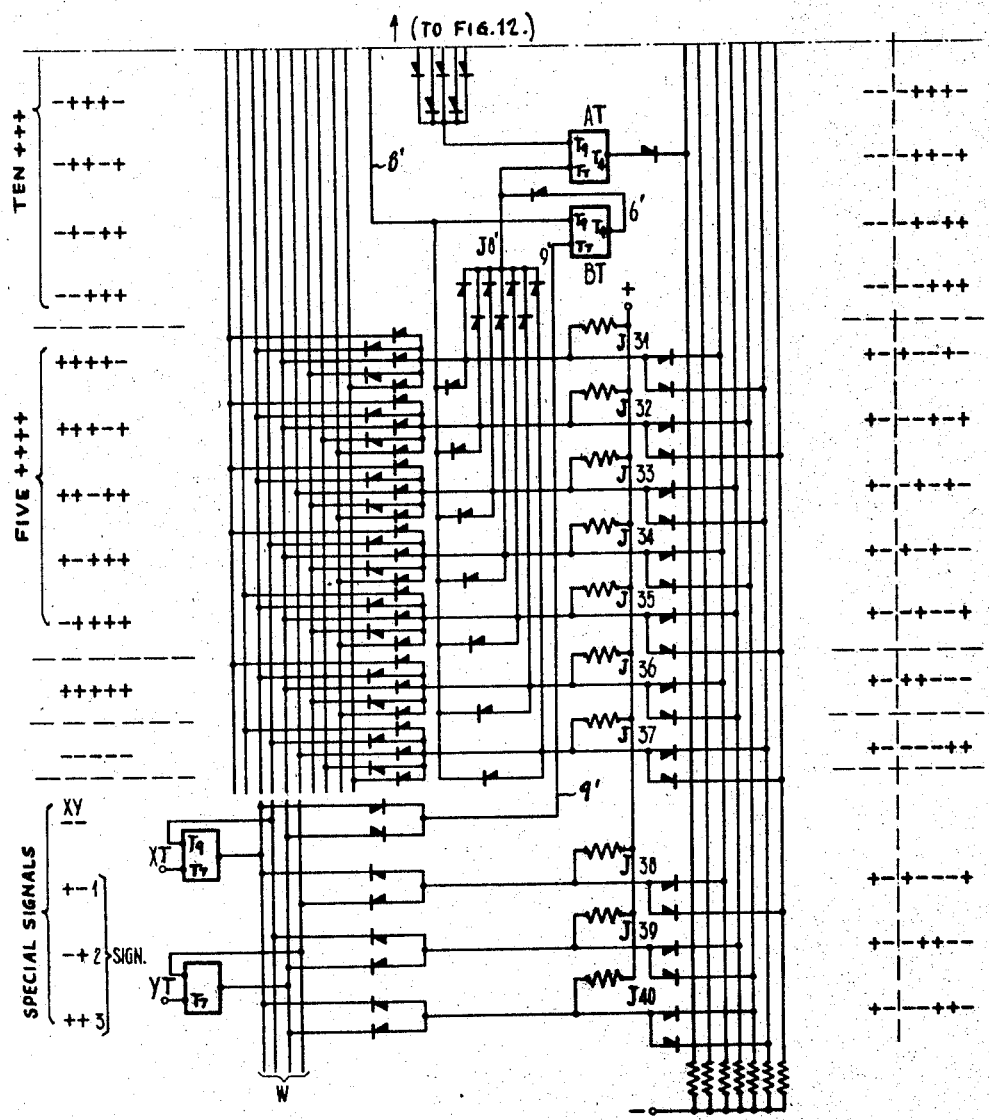
Figure 14:
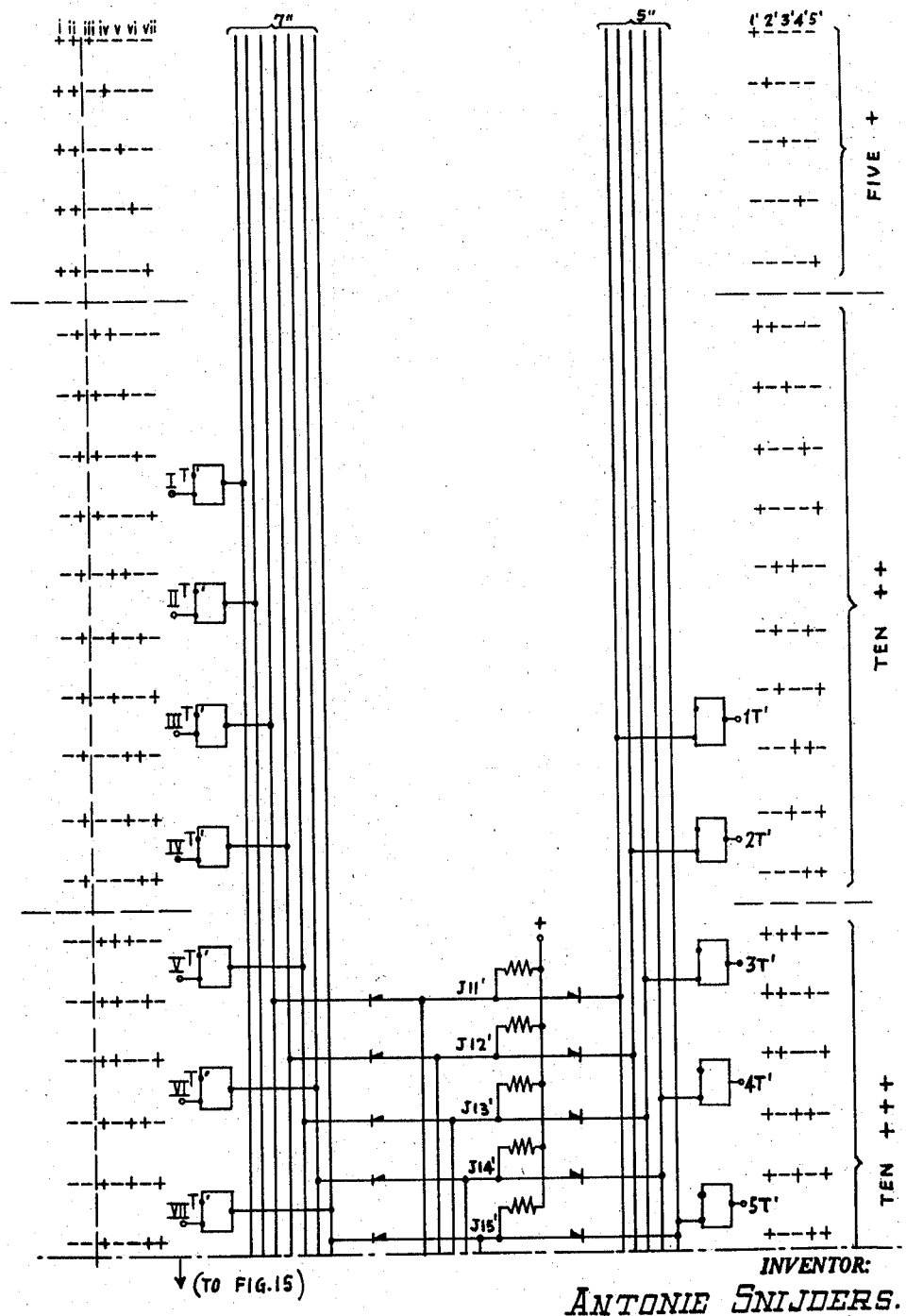
Figure 15:
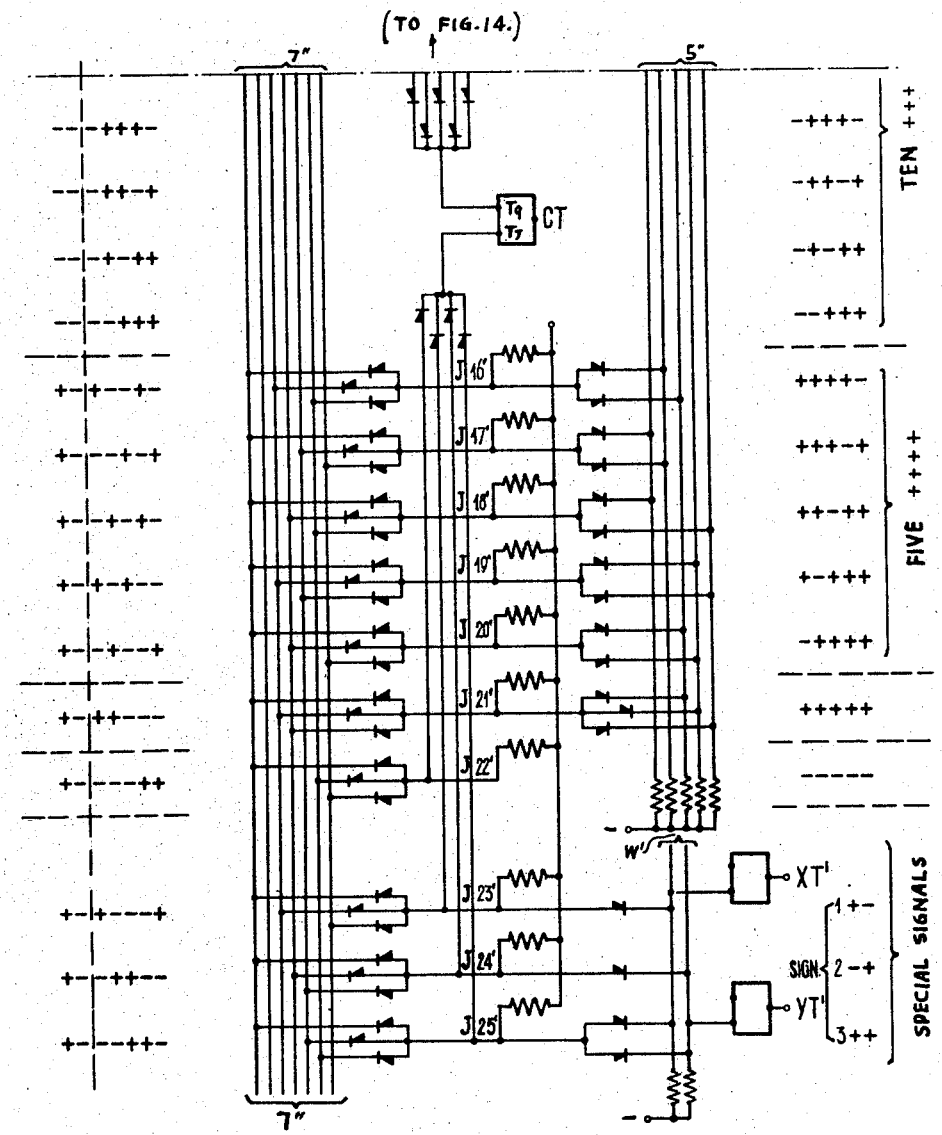
Figure 16:
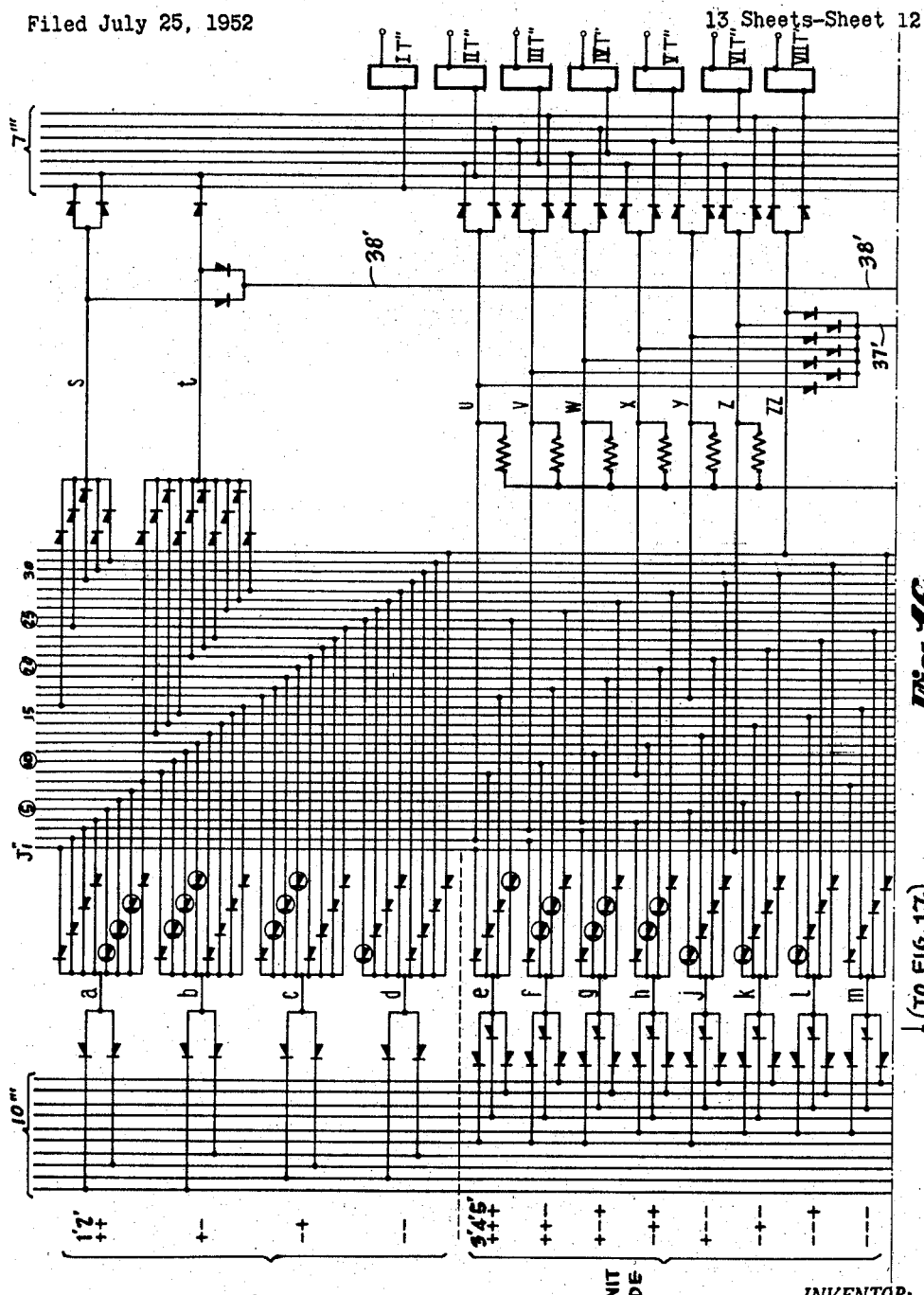
Figure 17:
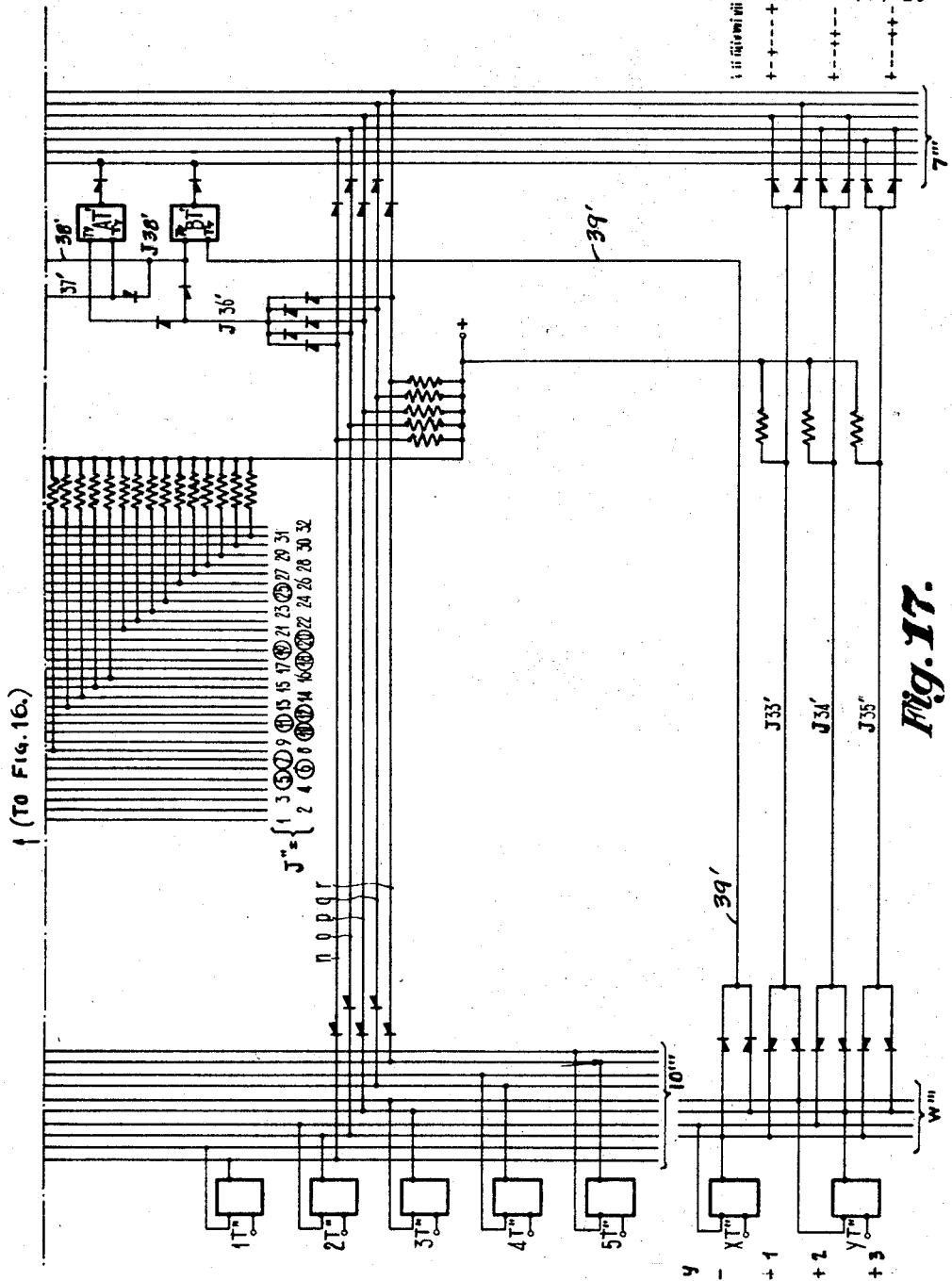

Fig. 5 comprises graphs of the grid current and plate output voltages for various input voltages at different terminals of the standard trigger circuit shown in Fig. 4;

Fig. 6 is a block diagram of the circuits shown in Figs. 9, 10 and 11;

Fig. 7 is a block diagram of the circuits shown in Figs. 12 and 13;

Fig. 8 is a block diagram of the circuits shown in Figs. 14 and 15;

Figs. 9, 10 and 11 taken together disclose a schematic wiring diagram of a code converting system for converting a five element or unit binary code into a seven element or unit constant-ratio binary code for an automatic telegraph system as shown in said Snijders divisional application Serial No. 188,658 comprising groups of rectifier matrices including a plurality of electronic relay cell means similar to that shown in Fig. 2, with the corresponding signals of the input code being shown opposite those of the output code in Fig. 11;

Figs. 12 and 13 in combination disclose a schematic wiring diagram of another code converter system for converting the same code shown in Fig. 11, but employing a fewer number of rectifiers by arranging the signals of the input and output codes so that those which are related or dependent upon each other need not be specifically converted but only detected and gated through the system, including a separate matrix in Fig. 13 for the added special signals;

Figs. 14 and 15 in combination show a schematic wiring diagram of a code converter similar to that shown in Figs. 12 and 13, but for reconverting the final or seven-unit code of that system back into its initial or five-unit code; and Figs. 16 and 17 in combination disclose a schematic wiring diagram of another embodiment of a code converter system of this invention for converting the same five-unit code into the same seven unit constant ratio code by dividing the five-unit code into two separate codes, one of two units and the other of three units and separately converting these two codes and then combining them into the final seven-unit code whereby the number of rectifiers required in the conversion is still further reduced.

The following detailed description of the above figures and embodiments of this invention is divided according to the following outline:

I. Circuit components:
   (1) Electronic relay cell means (Figs. 1, 2, 3)
   (2) Standard trigger circuit (Figs. 4, 5)
   (3) Types of matrices (Figs. 6, 7, 8)

II. Code converter systems:
   (1) Independent code converter (Figs. 9, 10, 11)
   (2) Dependent code converters—
     (a) A lesser into a greater element code (Figs. 12, 13)
     (b) A greater into a lesser element code (Figs. 14, 15)
   (3) Divided code converter (Figs. 16, 17).

I. CIRCUIT COMPONENTS

(1) Electronic relay cell means

Figure 1:
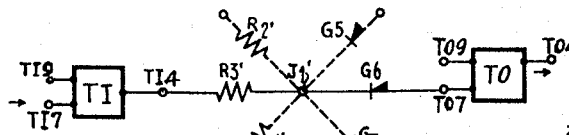
Fig. 1 is a schematic wiring diagram of a unilateral type of electronic relay cell means according to Snijders parent U.S. patent application Serial No. 35,403 now U.S. Patent 2,620,395.

Referring specifically to Fig. 1 there is shown a unilateral type electronic relay cell means, that is one in which unidirectional resistances are only employed in the output circuits. This type relay cell is shown connected between an input circuit TI and an output circuit TO to the points TI4 and TO7, respectively. Between these points TI4 and TO7 is a common junction J1' on a common conductor, which conductor respectively contains a linear or nondirectional resistance R3' and a unidirectional resistance or rectifier G6. The input circuit TI may comprise a trigger type circuit as described in Section I-2 below and disclosed in Fig. 4 from which two different potentials may be had from its output terminal TI4 by the application of different potentials to its input terminal TI7, with its other output terminal TI9 taking the opposite of the two potentials to that occurring at the output terminal TI4. The output circuit TO may also be a trigger type circuit as shown in Fig. 4. For example, if a positive potential is applied to the point TI4 the common junction J1' will become positive which potential will be blocked by the uni-directional resistance G6 so as not to affect or change the potential at the point TO7; while on the other hand if a negative potential were applied to the point TI4 the junction J1' would also become negative which potential would be conducted through the unidirectional resistance G6 to apply a negative potential to the point TO7.

A plurality of input circuits may be connected to the junction J1' through separate linear resistances R2' and R4' so that the junction J1' could take any one of a plurality of different potentials corresponding to whether one, two, three or none of the inputs through the resistances R2', R3' and R4' were positive or negative. Also the junction J1' may be connected to more than one output circuit through other rectifiers or unidirectional resistances G5 and G7 so that other output circuits similar to TO may be controlled by the potential at the junction J1'. For example, if all the input circuits were positive the junction J1' would have its highest positive potential, if two of the three were positive then it would have the next highest positive potential, if only one of the three were positive it would have next to its lowest potential, and if none of the three were positive the junction J1' would be negative. Thus, the output circuit TO or circuits may respond to any one or more of the different potentials applied to the junction J1' depending upon the corresponding bias which may be applied to the output circuit or circuits TO.

All the rectifiers or unidirectional resistances G5, G6 and G7 may be conductive in the opposite direction from that shown in Fig. 1 so that the most positive potential instead of the most negative potential will reach the output trigger circuit TO. Also more input circuits may be connected in the point J1' to give a correspondingly additional number of different potential levels at the junction J1'. It is the detection of one or more of these potentials on respective ones of the thirty-two or more parallel conductors of the large matrix shown in Figs. 2 and 2A of the Snijders Patent 2,620,395 that is detected by the bias applied to the output circuit B1 shown in Figs. 1 or 2A of this patent and which produces the desired off and on, positive and negative, or mark and space condition of each of the successive signal elements of the seven element output code converted in the code converter system of this patent.

An improvement of such an unilateral electronic relay cell arrangement is disclosed in Fig. 2 wherein the input circuits are also connected through unidirectional resistances or rectifiers thereby forming a multi-lateral instead of unilateral relay cell means. In this circuit arrangement of Fig. 2 the input circuit TI' has a relatively low output impedance with respect to the input impedance of the output circuit TO', which circuits are connected between the point TI'4 and TO'7 by a common conductor having a junction J1 between two opposing unidirectional resistances or rectifiers G2 and G3, respectively. For that reason any potential applied to said input circuit TI' so that it causes a current through rectifier G2 and output circuit TO', effects a nearly equal potential at point J1. This arrangement is thus responsive only to a given potential condition and not to the different potential levels as that disclosed for the unilateral cell or arrangement of Fig. 1. Accordingly, if a negative potential is applied to the input terminal TI'4 it will pass the rectifier G2 and make the junction J1 negative regardless of what other input potentials are applied via the other inputs through the rectifiers G2', G2'', G2''' and G2'''', and such is also true of a negative potential applied to any other one of these circuits because the junction J1 will always be negative as long as at least one negative potential is applied to it. However, if only positive potentials are applied to all of these input rectifiers G2 through G2'''', then the junction J1 may take no negative potential and is instead at a positive potential from the positive potential source connected to it through a relatively low impedance R4'' (which impedance is preferably greater than the impedance of the input circuit TI' but less than the impedance of the output circuit TO'). Similarly, more than one output rectifier G3 and G3' may be connected to the common internal junction J1 and be controlled simultaneously thereby. Thus, the electronic relay circuit arrangement or cell means shown in Fig. 2 only permits the output circuit TO' to respond to positive or negative potentials on the common point J1 and not to different potential levels, thereby permitting a more definite and a polarized relay type of action with its particular circuit.

The control of such a relay cell as shown in Fig. 2 for different potential levels, however, may be effected by the employment of external points or junctions between rectifiers in series connected to the internal junction J1 or connected beyond the output terminal TO'7, as will be described later in connection with the system of Figs. 16 and 17 in Section II–3.

Figure 3:
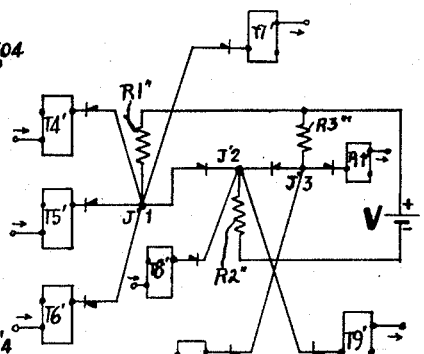
Fig. 3 is a schematic wiring diagram of a series arrangement of three electronic relay cell means similar to that shown in Fig. 2 connected to a plurality of input and output circuits.

The cells shown in Fig. 2 also may be arranged in series alternately with trigger circuits of the type shown in Fig. 4 as disclosed in Fig. 3 wherein the three junctions J'1, J'2 and J'3 are successively controlled depending upon the potentials or conditions of the input trigger circuits T4', T5', T6', T8' and T10' to apply either a positive or a negative potential at their corresponding output terminals connected directly through rectifiers to the junctions J'1, J'2 and J'3 through other rectifiers respectively. In order that the impedances of the input and output circuits of the series of junctions J'1, J'2 and J'3 may be properly matched, separate potential sources from the battery V are applied respectively to them through properly valued ohmic resistances R1", R2" and R3" so that the impedance of the input and output circuits of each of the three stages are correspondingly greater from the left to the right of the circuit shown in Fig. 3. For example, junction J'1 is connected to take the most negative potential applied to it from the input circuits T4', T5' and T6' and thereby controls the junction J'2 which will take the most positive potential which is applied to it from the junction J'1 and the input circuit T8', and then similarly the junction J'3 is further connected to take the most negative potential applied to it from the junction J'2 and the input circuit T10', so that the final output circuit T11' is directly and indirectly controlled by the conditions of the five input circuits T4', T5', T6', T8' and T10'.

In the electronic relay cells of this invention all of the uni-directional resistances or rectifiers connected to any one internal junction from both the input and output circuits, are all conductive in the same direction with respect to the junction, namely they either all are conductive toward the junction or they all are conductive away from the junction. Furthermore, the unidirectional resistances or rectifiers shown in the circuits of Figs. 1, 2 and 3 or any of the other circuits later described in this invention may be replaced by diodes, transistors, germanium triodes, crystal triodes, or the like without departing from the principle and scope of this invention.

*(2) Standard trigger circuit*

One form of input and output circuits shown in boxes in the schematic wiring diagram of Figs. 1, 2, 3, 14, 15, 16, 17, 18, 19 and 20 is shown in detail in Fig. 4 which may be considered as a standard trigger or flip-flop circuit having two possible states of equilibrium.

This standard trigger circuit comprises a pair of electron tubes, such as double triodes B1a and B1b (which may be for example an E90CC tube), which are connected by means of a number of resistors, and may also contain a pair of neon indicator lamps L1 and L2 (each of which may be for example a Hivac NT2 type tube) to indicate which one of the two tubes is conducting at any given time. These two tubes B1a and B1b have a common cathode resistor R15 which may be connected through terminal T11 to the negative pole of a battery (not shown). The anode resistances of the tubes are connected respectively to parallel resistors R1/R2 and R4/R5 which then may be connected through a terminal T2 to the positive pole of the same battery. Voltage dividers R6/R11 and R9/R19 may be connected from the anodes of the tubes B1a and B1b, respectively, to the same negative pole of the battery with the taps or center points of these voltage dividers between their respective pairs of resistors being connected to the output terminals T9 and T4, respectively, of the trigger circuit. If the resistance R6=R9 and also resistance R11=R19 in ohmic values, then when the circuit triggers from one condition or state to the other, equal potentials will be alternately applied to the output terminals T9 and T4. Between these two output terminals T9 and T4 is connected a pair of resistors R12 and R18 in series with each other, which resistors may be of equal value, and the connection between them may be connected to another terminal T6 of the trigger circuit, which terminals, such as terminals T6, T6', T6" and T6''' of a plurality of other such trigger circuits T', T" and T''', respectively, in a given system are connected together or to a common ground maintained at a potential between that of the positive and the negative terminals T2 and T11. Also in this standard trigger circuit are two high ohmic voltage dividers R8/R16 and R7/R14 connected from the respective anodes of the tubes B1a and B1b to the negative battery pole through the terminal T11. These two voltage dividers R8/R16 and R7/R14 are in parallel with the voltage dividers R6/R11 and R9/R19 mentioned above and may have the same respective ohmic values. The tap to voltage divider R8/R16 is connected to the control grid of the tube B1b and also through a resistor R17 to the ground terminal T6. The tap of the voltage divider R7/R14 is connected to the terminal T5 and also through a resistor R13 to the same terminal T6. The control grid of the tube B1a is directly connected to the input terminal T8 and may also be connected via a resistance R10 to another input terminal T7 to limit the amount of grid current flowing through the tube B1a when it is conductive. Since the directly connected input terminal T8 will surge with substantial amounts of grid current, this terminal should not be used for controlling the trigger circuit from electronic relay cells, but input terminal T7 then should be used instead. The anode of the tube B1a is directly connected to the terminal T3. The gas filled or neon indicator tubes L1 and L2 are also connected to the anodes of the tubes B1a and B1b, respectively, and thence via a common resistance R3 through the terminal T12 to the positive pole of the battery. Terminals T1 and T2 of this trigger circuit supply the current for heating the cathodes of the tubes B1a and B1b.

If the control grid of the tube B1a is strongly negative with respect to its cathode, it is non-conductive and carries no current; and via a voltage divider R8/R16 a positive potential is applied to the control grid of tube B1b through resistors R8, R1/R2 from the positive terminal T2. The tube B1b is then conductive which makes its anode voltage lower or less positive than the anode voltage of the tube B1a, so that the indicator lamp or tube L2 glows and indicator lamp or tube L1 is extinguished. The output terminal T9 thus has a higher positive voltage than the output terminal T4, and terminal T6 thus has a voltage which is intermediate the voltages of the output terminals T9 and T4 because the resistors R12 and R18 are preferably selected to have equal ohmic values. When the potential to the control grid of the tube B1a rises or becomes more positive to a predetermined voltage, this tube B1a will become conductive placing a more negative voltage on the grid of the tube B1b through resistor R8, and as a result of which the tube B1b will then become non-conductive. The indicator lamp L1 then begins to glow and lamp L2 is then extinguished. The output terminals T9 and T4 then also interchange their voltages. The circuit is so connected that the transition from one condition to the other takes place substantially instantaneously or with a jump, or triggers, which action occurs within a small voltage range of say about 1 volt or ± half a volt of the predetermined control voltage at the input terminal T7 or T8. In either condition of the circuit, however, the terminal T6 has substantially the same voltage because the resistors R12 and R18 are equal. Thus if the input terminal T7 bears a voltage that is nearly equal to the voltage of the terminal T6, i.e. slightly below or slightly above (i.e. more negative or more positive than) that on terminal T6, the condition of the circuit changes.

This operation may be more clearly illustrated by a specific example, the results of which are shown on the graphs in Fig. 5. In one example the values of the resistances or resistors have been considered to be as follows:

R1=R2=R4=R5=R6=R9=R11
=R12=R18=R19=39 kilo ohms (kΩ);
R7=R8=R13=R14=R16=1 megohm (MΩ);
R3=820 kΩ;
R10=470 kΩ;
R15=50 kΩ;
R17=270 kΩ;

The battery potential between terminals T2 and T11 may amount to 220 volts.

With the tube B1a non-conductive the output terminals T9 and T4 bear voltages of about 80 volts and about 60 volts, respectively, and the input voltage at terminal T7 or T8 will be lower than 70 volts; while terminal T6 has a voltage of 70 volts (see Fig. 5). If the input voltage (the abscissa) of the graph shown at B in Fig. 5 is increased above 70 volts to about 70.5 volts, the output voltage (the ordinate) at terminal T4 changes from 60 volts to 80 volts and terminal T9 changes of 80 volts to 60 volts. In the case of a further increase of the input voltage at terminal T7 or T8, the voltage occurring at the output terminals T4 and T9 remain practically unchanged as can be seen by the substantially horizontal lines T4 and T9 of the curves in Fig. 5. If the input voltage is decreased, the voltage will revert to the original condition when the input voltage reduces to about 69.5 volts (see the dotted lines at B in Fig. 5).

If the output terminals T9 and T4 are loaded, the voltage occurring at these terminals would change, which also would change the voltage occurring at terminal T6 because it is connected to have a voltage halfway between that at terminals T9 and T4, and since there is a coupling between the control grid of the tube B1b through a resistance R17 and the terminal T6, there would also be a change in the input voltage to tube B1b which could cause the circuit to change its condition. However, since several of these circuits must cooperate in one system according to this invention, the terminals T6, T6', T6" and T6'" are connected together so that the voltage levels at these terminals remain constant and as equal as possible.

The output of the tubes B1a and B1b indicated by curves T10 and T3, respectively, are disclosed in Fig. 5 to have a wider voltage range than those taken from the terminals T9 and T4 because of the resistances of the voltage dividers R6/R11 and R9/R19, respectively, through which terminals T9 and T4 are connected. There is also shown for comparison purposes at the top of Fig. 5 a graph of the grid current in microamperes (μa.) of the tube B1a with respect to the input voltages at terminal T7 or T8 to show when the tube B1a is conductive with respect to the voltages at output terminals T3, T4, T9 and T10.

The output terminal T5 (see Fig. 4), which may have the same potential as at output terminal T4, is of high ohmic value or nature and may be connected to the input terminal T7 as a stabilizer so that the condition of the trigger circuit remains unchanged after the controlling input voltage has been taken away from the terminal T7 or T8. Such a circuit connection is shown by dotted line conductor T15 and is employed in converting the standard circuit of Fig. 4 to a memory device or storing circuit and thus may be used for pulse control as well as for potential control purposes. In connection with the connection T15 another dotted line connection may be made to the output terminal T3 comprising a delay circuit of a condenser C1 and a resistance R20 to which may be connected to a switch T13 so that a prior potential stored in or state of the trigger circuit may be transferred through the switch T13 each time a subsequent potential is to be applied to the trigger circuit for storing without being immediately cancelled by the application of the new signal to be stored.

II. CODE CONVERTER SYSTEMS

The application of the electronic relay cell means of this invention in matrices will now be described in connection with actual code converter systems for the conversion of a five unit or element code into a seven unit or element constant ratio code, and vice versa, which systems may be employed in automatic telegraph communication systems.

(1) *Independent code converter*

Referring to Fig. 6 or Figs. 9, 10 and 11 there is shown the system of Snijders copending divisional application Serial No. 188,658 for converting a binary five element or unit Baudot code (each signal independently) into a binary seven element or unit constant ratio code of three spaces to four marks by means of purely rectangular matrices. Furthermore, the circuit of this system is substantially identical with that disclosed in Snijders Patent No. 2,620,395 except that instead of the resistance elements R1 through R160 along the tops and bottoms of Figs 2 and 2a, unidirectional resistance elements, such as rectifiers 33–192 (see Figs. 9 and 10 of the present invention), are employed and a series of resistances 193–224 are connected respectively to each of the parallel conductors 1–32 of the major rectangular matrix for the first conversion stage of the $2^5=32$ signals of the five element binary code to be converted in this circuit. These horizontal conductors 1–32 herein correspond to thirty-two junctions of separate electronic relay cell means of the type shown in Fig. 2 and the output circuit of the system comprising the electron tube 246 in Fig. 11 does not now have to be carefully biased to respond only to a given potential level but need now only respond to the presence of a positive potential regardless of its level.

In Fig. 11 the signals of the code being converted are tabulated along the left side of the figure while the signals of the final output constant ratio seven element code corresponding to each of five unit input code signals are tabulated along the right side of the figure with the space or negative elements of the signals written as X's and the mark or positive elements of the signals written as O's. The signals of the seven unit code correspond to the connections and potentials in each of the seven output conductors or rails 238 forming the base of a rectangular output rectifier matrix. This seven unit constant ratio code also has the possibility of three more signals than the 32 signal five-unit input code in view of equation:

$$C_7^3 = C_7^4 = 35$$

These three additional signals may be used by directly connecting three special signal switches S1, S2, S3 shown in Fig. 9 to the three additional conductors 235, 236 and 237 shown along the bottom of Figs. 6, 9, 10 and 11 which are directly connected to the output rectifier matrix in Fig. 11.

Referring now to Figs. 6 and 9, the five different elements or units of the input code may be separately represented by reference characters I–V, each of which has a corresponding two-way switch which may be operated by a telegraph tape reader or teleprinter or like switching device. These five switches alternately connect through either their prime (′) or double prime (″) contacts a corresponding group rectifier sub-matrix I′–V″ with a common potential source such as the ground or positive terminal 249 through the series of manual switches S1, S2 and S3. The rectangular five sub-matrices or groups I′ through V′ contain sixteen rectifiers each numbered 33–112 shown along the top of Figs. 9 and 10, while the five sub-matrices or groups I″–V″ containing rectifiers 113–192 are shown along the bottom of Figs. 9 and 10. Thus with the two positions for each of the input switches I–V, ten separate groups of sixteen rectifiers are provided, and each of the electronic relay cell junctions or conductors 1–32 is connected to five of these groups, which five groups differ for each of the 32 conductors, so that an intermediate constant ratio code of 31:1 elements per signal may be produced at these junctions 1–32 which are then connected to another and output rectifier matrix shown in Fig. 11 through thirty-two sub-groups of three rectifiers each which are connected correspondingly to the output rails or conductors 238, each junction being connected to a different combination of three of said seven conductors. Four rectifiers instead of three may be used for each sub-group to produce the converse of the seven-unit code signals shown, but since rectifiers are comparatively expensive elements it is more economical to employ as few rectifiers as possible. The seven output conductors or rails 238 may be separately and successively connected, through switching devices such as commutator switches 239–245 in synchronism with the operation of the switches corresponding to the elements I–V of the input code, to the grid of the output circuit electron tube 246 to operate the output relay OR in the plate circuit of said tube 246 to reproduce successively the seven elements of the signals of the final output code.

For example, the signal OOOOO corresponding to the full line positions of the input code element switches I–V in Fig. 9 applies a positive potential from the terminal 249 through the normally closed special signal switches S1, S2, S3 to each of the input code element switches I–V and thence to their corresponding rectifier matrix groups I′ through V′ along the top of Figs. 9 and 10, so that rectifiers 33–112 each have applied to them a positive potential. The negative potential from the battery 248 correspondingly connected through resistances 225, 227, 229, 231 and 233 is shorted by the position of the switches I–V but is applied through resistances 226, 228, 232, 234 to the corresponding groups I″ through V″ containing rectifiers 113–192. Since each of the conductors or junctions 1–32 of the major rectifier matrix in Figs. 9 and 10 is connected through resistances 193–224, respectively, to a positive potential or ground 249, each of these junctions 1–32 will take the most negative potential applied to it and accordingly all of them will take negative potentials that are connected to any one of the rectifiers 113–192. However, none of the rectifiers 113–192 are connected to the first conductor or junction 1 of this system, so that only positive potential is applied to it through the rectifiers 33, 49, 65, 80 and 96 and it is positive. With junction 1 positive, positive potential is applied through rectifiers 251, 252 and 253 of the output matrix of Fig. 11 to the second, third and seventh conductors of the conductor rails 238, so that as these three specific conductors are successively scanned in a timed sequence by the commutators 240, 241 and 245, a positive potential will be applied to the input terminal of the tube 246 to then and only then operate the output relay OR to produce the signal XOOXXXO, in which the O's occur at the times the elements correspond to a positive potential on the output rails 238. Similarly, for each other operative combination of the input switches I–V of which there are thirty-one other combinations, one and only one of the thirty-two junctions or horizontal conductors 1–32 will become positive to produce only one of the output signals shown in the table at the right of Fig. 11.

Likewise, such a seven unit code may be converted back to a five unit code through the same code converter circuit shown in Figs. 9, 10 and 11 by only reversing the polarity of the signal elements and interchanging the input and output switching devices. Thus this code converter circuit is reversible.

The special signal switches S1, S2 and S3 are placed in series with the connection to the code element switches I–V in Fig. 9, so that when one of these special switches is operated the code signals will automatically be cut off, and only negative potentials through the resistances 225–234 will be applied to all of the junctions 1–32, and only a positive potential will be applied to the corresponding conductor 235, 236 or 237 for which a special switch S1, S2 or S3 has been operated. As shown in Fig. 11 these conductors 235–237 are correspondingly connected to the three remaining different combinations of rails or conductors 238 to produce signals XOOXOXX, XXOOOXX and XXOOXXO respectively.

In this system the ohmic values of each of the resistances must be such that five times the ohmic value of any of the resistance 225–234 is less than the ohmic value of any of the resistances 193–224 which must also be less than the ohmic value of the resistance 356 in the output circuit in Fig. 11 connected to the negative terminal of the battery 357, so that the grid of tube 246 will take the most positive potential between the ground and the negative terminal of the battery 357.

By the use of the electronic relay cell means of Fig. 2 of this invention it may be possible to eliminate the number of rectifiers required. This is because such an electronic relay cell operates only if all of the input rectifiers connected to its internal junction have the same polarity, and if only one has another polarity it is immaterial what the polarities of the rest of the input rectifiers have applied to them. With this possibility of disregarding or omitting certain connections for certain signals, asymmetrical matrices may be employed having a reduced number of rectifiers from that required in an independent code converter system so that more economical fully electronic dependent code converter systems may be produced which will now be described below.

(2) Dependent code converters

By comparing the signals of the two codes in the tables to the right and left in Fig. 11, the five-unit code at the left contains five signals which contain only one positive element, ten signals which contain two positive elements, ten signals which contain three positive elements, five signals which contain five positive elements, one signal which contains all positive elements, and one signal which contains no positive elements. Now since the conversion according to the example described above is to produce a seven-unit code having three positive elements (marks or O's) in each signal, it can be seen that the first group of five signals of the five-unit code which contains only one positive element may have two more positive elements added to each of them without conversion of any of the elements of these five signals. Furthermore the ten signals containing two positive elements need to have only one more positive element and one negative element added to each of them without conversion so that ten more signals do not need to be converted. Then there are still ten more signals which contain just three positive elements to which two negative elements may be added without changing them. Accordingly twenty-five out of thirty-two signals may be directly employed in the output code without conversion if these twenty-five signals may be detected in their corresponding groups thus leaving only seven signals which must be converted in specific matrices for this purpose. This particular theory also applies to the conversion of the seven element code back into the five element code wherein these two indicator elements need only to be ignored.

Thus the five and seven-unit codes herein converted have many signals in common which are definitely dependent upon each other and the next two systems are directed only to the conversion of those particular signals of both codes which do not have related, dependent or similar elements.

(a) LESSER TO GREATER ELEMENT SIGNALS

Referring now specifically to the dependent converter system shown in Fig. 7 or Figs. 12 and 13, along the left hand side of these figures the thirty-two signals of the five-unit code have been grouped as described above with those signals containing one +, two ++, three +++, four ++++, five +++++, and no + elements being grouped together, and directly opposite each said signal along the right side of Figs. 12 and 13 the corresponding converted seven-unit code signals. The first three of these groups of twenty-five signals have two indicator elements i and ii added in front of them, which indicators for the first group of five signals are both +, for the next group of ten signals are − and +, and for the third group of ten signals are both − (see Figs. 7, 12 and 13). The last ten signals of the seven-unit code have indicators which are + and − and correspond to the seven signals of the five-unit code which must be converted, as well as the additional special signals.

The input circuits or switching devices for each of the elements are shown to be electronic trigger circuits 1T, 2T, 3T, 4T and 5T in Fig. 7 or 12 corresponding to each of a five element 1′, 2′, 3′, 4′, 5′ of the five-unit code being converted. These input circuits, as previously described with Fig. 4, have output terminals T9 and T4 each which are opposite in polarity to each other, with output terminal T4 taking the same polarity as the signal element applied to the input terminal T7. These output terminals are then considered respectively to the ten vertical input rails or conductors 10′ forming part of the first matrix or matrices of this converter system. Correspondingly, the output switching devices or circuits of which there are seven, one for each element of the final seven unit code, are connected to seven electronic output rails or conductors 7′ and comprise the seven trigger circuits IT–VIIT also shown in Fig. 12, the output terminals T4 of each of which effecting potentials corresponding to the terminals i through vii of final seven-unit code. The output terminals T4 and T9 of the input trigger circuits 1T–5T provide lower impedances than the input terminals T7 of the output circuits IT–VIIT, so that between the matrices of the common conductors or rails 10′ and 7′ electronic relay cell means similar to that shown on Fig. 2 may be employed.

The electronic relay cell means between the input and output rails 10′ and 7′ have internal junctions J11–J40, each of which is connected through a resistance and a common conductor to a positive potential source, so that each of these junctions will take the most negative potential applied to it and will only permit a positive potential to be passed through their output rectifiers toward the right of the junctions to the rails 7′ when all of its input rectifiers are connected to a positive potential.

The first fifteen electronic relay cells having junctions J11–J25 connected to different combinations of five of the input rails 10′ are primarily employed in detecting fifteen of the twenty-five five-unit code signals which need not be converted and correspondingly may have applied to them the proper two indicating elements i and ii determined by the first two rails or conductors 7′ and correspondingly these first fifteen electronic relay cells are only connected to these first two rails.

Specifically as each of the first five-unit code signals shown at the top left of Fig. 12 are connected to the input conductors 10′, they are specifically detected to affect a corresponding one of the junctions J11–J15 to apply a positive potential to the both of the first two indicator elements i and ii of the output conductors 7′ of the seven-unit code. Similarly, the next ten five-unit code signals each containing two positive elements are specifically detected to affect a corresponding one of the relay cell junctions J16–J25 to apply a positive potential only to the second output rail conductors 7′; all of these rails 7′ normally having negative potentials so that the first rail will be negative, in view of the negative connection to each of the rails as shown at the bottom of Fig. 13. Since the third set or group of dependent or related five-unit code signals having three positive elements each and require both negative indicator elements i and ii to be negative, there is no need for a specific connection for detecting these ten signals in that they may be directly transferred to the last five rails of conductors 7′ because the first two rails are maintained normally negative when not specifically changed.

The next five electronic relay cells having junctions J26–J30 comprise a part of a gate circuit and are directly connected between the first, third, fifth, seventh and ninth input rails or conductors 10′ and the third, fourth, fifth, sixth and seventh output conductor rails 7′, so that the signals which comply or are detected as being within the twenty-five which may be passed without conversion are correspondingly passed through these five relay cells. These five gating electronic relay cell junctions J26–J30 are also connected at the bottom of Fig. 12 through an additional group of five rectifiers to the output terminal T9 of a first gating trigger circuit AT of the type shown in Fig. 4. This first gating trigger circuit AT is controlled directly from the relay cell junctions J31–J37 or by a second gating trigger circuit BT which in turn is controlled by the special signal elements shown at the bottom of Fig. 13. The relay cells having junctions J31–J37 are connected to detect only the seven five-unit code signals which need to have their elements converted, that is those having more than three or no positive elements. Unless one of these seven signals is specifically detected by one of these electronic relay cell means having junctions J31–J37, no positive potential will be applied to a junction J8′ through one of the group of rectifiers connected to junctions J31–J37, which junction J8′ is connected to the input terminal T7 of the first gating trigger circuit AT and its output terminal T9 will remain positive so as not to affect the operation of the gate circuits of relay cells J26–J30.

Since only the seven signals having elements which must be converted affect the gating trigger circuit AT, all the twenty-five other signals will pass through the gating circuit relay cells having junctions J26–J30, and of these twenty-five signals only two groups thereof or fifteen signals need be detected by relay cells having junctions J11–J25 to produce a change from making both the indicator elements i and ii negative.

On the other hand if one of the particular seven input signals having more than three positive elements or no positive elements is applied to the input trigger circuits 1T–5T, its corresponding relay cell junctions J31–J37 will apply a positive potential to the junction J8′ to change the state of the trigger circuit AT so that its output terminal T9 will apply a negative potential to each of the gating junctions J26–J30. This negative potential applied to each gating junction J26–J30 will block all other positive potentials applied to these junctions from the first, third, fifth, seventh and ninth input rails or conductors 10′ so that no signals will be transferred through the gate circuit of relay cells J26–J30 to affect the normally negative potential applied to said output conductors 7′. The operation of the trigger circuit AT into its positive state by the operation of one of the converting relay cells having junctions J31–J37, will apply a positive potential from its output terminal T4 to the first output rail or vertical conductor 7′ to produce the proper first positive indicator element i of the first two indicator elements of the last ten seven-element code signals shown at the right of Fig. 13. The second vertical output or rail 7′ is correspondingly maintained negative through the normally negative potential applied to each of the rails as shown at the bottom of Fig. 13 as above stated.

In the event one of the special signals is to be produced in this converter system, such may occur over a separate small four line matrix comprising the four vertical input conductors W as shown at the bottom left of Fig. 13, which conductors W are connected to the outputs of two input trigger circuits XT and YT. Three separate electronic relay cells J38, J39 and J40 are directly connected between the corresponding input conductors W and output rails 7' to produce the last three seven element signals shown to the right at the bottom of Fig. 7 or 13.

The first and third rail or conductor of the input conductors W are so connected that regardless of which one of the three special signals + —, — + or + + shown to the right in Fig. 13, is applied to the input trigger circuits XT and YT, a positive potential will be applied through rectifiers and conductor 9' to the input terminal T7 of the cut off or second gating trigger circuit BT, which then correspondingly applies a positive potential to its output terminal T4 and through conductor 6' and a rectifier to the input circuit of the first gating trigger circuit AT so that it will operate to block any signals applied to the electronic gating relay cells J26–J30. Also from the output terminal T9 of the cut off trigger circuit BT a negative potential is applied through conductor 8' to the junctions of each of the electronic relay cells J11–J25 in Fig. 12 and junctions J31–J37 in Fig. 13 so that none of the regular code detecting or converting relay cells can be affected by a positive potential, so that they cannot affect any of the conductors 7' except for the first rail which is directly controlled by the output terminal T4 of the trigger circuit AT as previously described. Thus, when a special signal is applied to the input circuits XT and YT the circuits for the thirty-two five-unit code signals are automatically cut out by the operation of the trigger circuits BT and AT. If the special signal of two negative elements (— —) is applied to the input circuits XT and YT, this will have substantially no effect on the trigger circuits AT and BT except that this signal (— —) may be used if desired as an "on" signal for the rest of the circuits by placing the trigger gating circuits AT and BT in their normal negative states so that the other thirty-two signals of the five-unit code may be converted as above described.

In comparing the dependent system of Figs. 11 and 12 with that of the independent system of Figs. 9, 10 and 11, the latter independent system of symmetrical rectangular matrices required 265 unidirectional resistances or rectifiers including those required for the special signals, while the dependent system required only 204 rectifiers or 62 fewer rectifiers for effecting the same code conversion.

(b) GREATER TO LESSER ELEMENT SIGNALS

Referring now to Figs. 14 and 15, a system similar to that shown in Figs. 8, 12 and 13 is adapted for reconverting the seven-element code of constant ratio back into the five element code. Along the left side of Figs. 8, 14 and 15, the seven element code signals are grouped identically as they are shown in Figs. 12 and 13, and the five element code signals are similarly grouped, respectively, opposite them along the right side of Figs. 8, 14 and 15. The seven input switching devices or trigger circuits IT–VIIT' are connected to each of the seven input conductors 7'' and the output switching devices or trigger circuits IT'–5T' are correspondingly connected to each of the five output conductors 5''. Since twenty-five of the thirty-five signals to be converted are identical with the five-unit code signals except for their first two indicator elements i and ii, their indicator elements may be ignored and the corresponding first twenty-five signals of the five-unit code are accordingly only connected to the third, fourth, fifth, sixth and seventh input rails or vertical conductors 7'' through electronic relay gating cells J11'–J15' shown in Fig. 14 from the corresponding conductor rails 5''.

The only combination of indicator elements i and ii which must be detected is the + — combination and of this combination only the first + element is detected by the last ten electronic relay cell junctions J16'–J25' corresponding to the last ten signals shown at the left in Fig. 15, which ten signals correspond to the seven signals to be converted and the three special signals. The first six of the seven electronic relay cells having junctions J16'–J22' merely add the additional positive potentials to the output conductors 5'' that are not detected and passed by the gating relay cells having junctions J11'–J15'. The other signal + — — — — + + corresponding to the all negative elements signal of the five-unit code is detected to control a gating circuit CT through relay cell junction J22'. The three special signals which affect the junctions J23', J24' and J25' are separately transferred to separate output conductors W' connected to the output circuits XT' and YT'.

The gating trigger circuit CT normally is maintained in its negative state so that a positive potential from its output terminal T9 will normally be applied to the junctions J11'–J15' of the gating relay cells. This normal positive potential applied to these junctions will not affect any signal elements directly applied to them for transfer to the output conductors 5''. However, if the five-unit code signal corresponding to all negative elements is to be produced, or any one of the three special signals is to be detected, a positive potential is applied to rectifiers from the corresponding junction J22'–J25' to the input terminal T7 of the gating trigger circuit CT, which thereupon changes it to its positive state and applies a negative potential to its output terminal T9 and thence through rectifiers to each of the gating junctions J11'–J15' to prevent them from passing any signal elements to the output conductors 5'' so that these output conductors 5'' will all normally be maintained negative as they are shown connected to a negative potential source in Fig. 15.

In the present reconverter system only 68 unidirectional resistances or rectifiers in all are required plus one additional trigger circuit (CT) as compared to 203 rectifiers and two additional trigger circuits (AT and BT) in the dependent system of Figs. 12 and 13.

(3) *Divided code converter*

It is still possible, however, to reduce further the number of rectifiers in a lesser to a greater element code converter by dividing the code to be converted into codes having signals composed of smaller numbers of elements, that is, signals of only one, two or three elements. These smaller signal codes are then each separately detected and/or converted and combined in asymmetric rectifier matrices employing special electronic relay cells having both internal and external junctions or points as previously mentioned in Section I–1 above.

It may be stated generally for the division of a code according to the principles of this embodiment that a code having signals of $2n$ units may be divided into $n$ codes of two unit signals; or that a code having signals of $(2n+1)$ units may be divided into $(n-1)$ codes of two unit signals plus one code of three unit signals, or into $n$ codes of two unit signals plus one code of one unit signals.

For example and comparison a system for converting a five-unit binary code into a seven-unit constant ratio binary code involving the same signals as the previously described systems is shown in Figs. 16 and 17. Instead of only grouping related or dependent signals and converting only those which are different as disclosed in the dependent systems of Figs. 12–15 described in Section II–2 above, this divided system also divides the five-unit input code signals to be converted into a four signal two-unit code and an eight signal three-unit code corresponding respectively to the first two elements 1' and 2' of the five-unit code and the last three elements 3', 4' and 5' of the five-unit code as tabulated at the left of Fig. 16. By combining each of the signals of the two-unit code with each of the signals of the three-unit code, 4×8=32 signals are obtained which are combined in a large rectangular matrix of possibly 32 conductors J"1–J"32.

Referring now specifically to Fig. 17 the input switching device or trigger circuit 1T", 2T", 3T", 4T" and 5T" for each of the five elements of the code to be converted are respectively connected from both of their output terminals T4 and T9 to the ten vertical input conductors or rails 10'''; the first four of which correspond to the two-unit code shown in the upper half of Fig. 16 and the last six of which correspond to the three-unit code shown in the lower half of Fig. 16. The output switching devices or circuits of this system comprise seven trigger circuits IT"–VIIT" in Fig. 16 which are respectively connected to each of the vertical output conductors or rails 7'''' along the right side of Figs. 16 and 17. The electronic relay cell means of the type shown in Fig. 2 are connected between the input rails 10''' and output rails 7'''' arranged in asymmetric matrices and combined in a possible thirty-two conductor major matrix whose conductors correspond to internal junctions J"1–J"32 of the electronic relay cell means. Each of these thirty-two conductors or junctions are connected to a positive potential source as shown in Fig. 17 so that these junctions will take the most negative potential applied to them.

The distribution of the four possible combinations or divided signals for the first two signal elements of the five-unit code from the first two input trigger circuits 1T" and 2T" is shown at the top of Fig. 16. The connections to the corresponding first four input conductors 10''' are combined in pairs through rectifiers to four external junctions a, b, c, d, which are then each connected through eight additional input rectifiers to the four different groups of eight major matrix conductors or junctions J"1–J"32 of the thirty-two possible electronic relay cells. The junctions a, b, c, d, can also be considered to be external junctions of these thirty-two cells. Correspondingly, the eight signals of the last three elements of the five-unit code from the three input trigger circuits 3T", 4T" and 5T" are connected to the last six input conductors and thence in groups of threes through rectifiers to eight more external junctions e, f, g, h, j, k, l, m which are then each connected through four additional rectifiers to one of the junctions J"1–J"32 of each group of eight junctions corresponding to the division of the two-unit code. These thirty-two multi-lateral electronic relay cells J"1–J"32 shown in Fig. 16 are primarily employed for detecting dependent or related signals between the input and output codes as in the dependent systems of Section II-2 above, so that the proper indicator elements i and ii may be added to the proper twenty-five signals which do not have their elements converted or changed.

Correspondingly as in the dependent system of Figs. 12 and 13, the five signals of the five-unit code which require two positive indicator elements i and ii (++) correspond to the junctions J"16, J"24, J"29, J"30, J"31, the outputs from which junctions are connected through rectifiers to a common external junction s which is connected through additional rectifiers to both the first and second output rails 7'''' to make them positive when one of said five junctions is positive. Similarly, the ten signals have indicators i and ii, + and −, respectively, correspond to the ten junctions J"8, J"13, J"14, J"15, J"21, J"22, J"23, J"26, J"27, J"28, the outputs from which junctions are connected through rectifiers and combined at an external junction t which is connected through another rectifier to the second rail of the output conductors 7'''' to make it positive when one of the said ten junctions are positive.

In the dependent system described in Figs. 12 and 13, the ten five unit signals which have their first and second indicator elements i and ii both negative do not need to be detected and such is also the case in the present system of Figs. 16 and 17, in that the normal condition of the two gating trigger circuits AT' and BT' shown in Fig. 17 and of the external junctions s and t is negative so that the first two rails of the output conductors 7'''' remain negative unless one of the other twenty-five signals is to be detected and/or converted.

The just mentioned twenty-five five-unit code signals which do not have to have any of their elements converted are transferred directly through the gating circuit electronic relays having junction conductors n, o, p, q, r, shown in Fig. 17, connected from the first, third, fifth, seventh and ninth input conductors or rails 10''' to the last five of the seven output conductors or rails 7'''', respectively, similar to the gating cells having junctions J26–J30 shown in Fig. 12 of the above described dependent system. These five gating electronic relay cell means also have their junctions connected to a positive potential source so that each one of these junctions n, o, p, q, r will take the most negative potential applied to it. Each of these junctions are also connected through rectifiers to the output terminals T9 of each of the two gating trigger circuits AT' and BT' to block the operation of these five gating junctions when one of the seven signals having elements to be converted or one of the three special signals is applied to this system.

The remaining seven signals of the five-unit code being converted are specifically detected and correspond to the seven junctions u, v, w, x, y, z, zz shown in Fig. 16, corresponding respectively with the junctions J"2, J"3, J"4, J"9, J"17, J"1 and J"31 of the major matrix. Each of these specific junctions are additionally connected through other rectifiers to a common conductor 37' to the input terminal T7 of the first gating trigger circuit AT'. This connection applies a positive potential to the input of circuit AT' when any one of these particular seven signals is detected so that the circuit AT' will change to its positive state and apply a positive potential to the first rail of the seven output conductors 7'''' to insure that the proper indicator elements i and ii will be + and − respectively; and also apply a negative potential from its output terminal T9 through a rectifier to the external junction J36' for all five of the gating electronic relay cell junctions n, o, p, q, r to block them from responding to any positive potentials or signals.

In a system for converting a five-unit code into a seven-unit constant ratio code there are three more possible signals in the seven-unit code over which special signals may be produced similar to those disclosed in the previous system. These three special and additional signals may be based on a two-unit code and applied to the input trigger circuits XT" and YT" shown at the bottom of Fig. 17 which are connected to four input conductor rails W''' and thence through three electronic relay cell means having junctions J33', J34' and J35' directly to the corresponding output rails 7'''' to produce the special seven-unit code signals shown at the lower right of Fig. 17 just as these signals are produced in the dependent system shown and described above in Fig. 13. Also as in the system of Fig. 13, two of the input rails W''' are connected through a conductor 39' to the input of a cut out or second gating trigger circuit BT' so that when any one of these special signals is produced a positive potential is applied to the input terminal T7 of this circuit BT' to change its normal negative state and apply a negative potential from its output terminal T9 to the junction J38'. This negative potential is then applied via conductor 38' to block the external junctions s and t of the detecting circuit relay cells, via rectifiers and conductor 37' to block the junctions u, v, w, x, y, z, zz of the converting relay cells, and via other rectifiers and junction J36' to block all of the gating relay cell junctions n, o, p, q, r. Thus, the thirty-two five-unit code conversion parts of this system are blocked from operation when any one of the three special signals is being produced.

Since ten of the thirty-two five-unit code signals are not specifically converted or detected according to this divided system, there are ten unnecessary conductors and electronic relay cells shown in the major thirty-two conductor matrix of this system, namely those corresponding to junctions J"5, J"6, J"7, J"10, J"11, J"12, J"18, J"19, J"20, J"25 which have their numbers and rectifiers shown in circles in Figs. 16 and 17. Thus all of these encircled parts may be omitted from this system.

Thus, by combining the knowledge gained from the dependent systems described in Section II-2 with the division of the input code, as well as the employment of common external junctions on several of the electronic relay cell means, the number of rectifiers required for this system has been reduced materially for the conversion of the five-unit code into the seven-unit constant ratio code.

Comparing this latter system of Figs. 16 and 17 with the number of rectifiers required in the systems of Figs. 9-13, only 151 rectifiers are required which is a further reduction of 52 rectifiers from that of the next lowest comparable system shown in Figs. 12 and 13.

While there is described above the principles of this invention in connection with specific apparatus it is to be clearly understood that this description is made only by way of example and not as a limitation to the scope of this invention.

While I have illustrated and described what I regard to be the preferred embodiment of my invention, nevertheless it will be understood that such is merely exemplary and that numerous modifications and re-arrangements may be made therein without departing from the essence of the invention, I claim:

1. A code converter circuit for conversion of $r$ unit binary code signals into $p$ unit binary code signals, one of said codes having a constant ratio between the numbers of each type of unit composing each signal thereof, and one of said codes having more signals than the other, said code converter circuit comprising: $r$ input switching devices, two groups of conductors, a plurality of interconnecting junctions between the conductors of one group and the conductors of the other group, a first set of rectifiers connecting pre-selected ones of said junctions through corresponding ones of said one group of conductors to said $r$ input switching devices, $p$ output switching devices, a second set of rectifiers connecting pre-selected ones of said junctions through corresponding ones of said other group of conductors to said $p$ output switching devices, and an additional switching device connected through additional rectifiers to further pre-selected junctions to that said group of conductors corresponding to said code having the more signals, said additional switching device corresponding to at least one of said signals of which there are more in the one code than in the other code.

2. A circuit for converting an $r$ unit signal code having at least $q^r$ unit combinations into a $p$ unit binary signal code having a different number of unit combinations, one of said codes having a constant ratio of the two types of units making up each signal, said code converter circuit comprising: two groups of conductors, a plurality of interconnecting means between the conductors of one group and the conductors of the other group, $r$ input switching devices, $p$ output switching devices, a first plurality of rectifiers connecting pre-selected ones of said interconnecting means to said $r$ input switching devices through pre-selected conductors of one group of said conductors, a second plurality of rectifiers connecting pre-selected ones of said interconnecting means to said $p$ output switching devices through pre-selected conductors of said other group of conductors, and an additional switching device connected through additional, rectifiers to further pre-selected interconnecting means through said conductors corresponding to that code having the more unit combinations for at least one unit combination signal of that latter code.

3. A circuit according to claim 2 wherein $r$ is 5 and $p$ is 7 and $q$ is 2.

4. A circuit according to claim 2 comprising at least $q^r$ conductors in one of said groups of conductors.

5. A circuit according to claim 2 wherein said plurality if interconnecting means comprises at least one interconnecting means for each unit combination of one of said codes.

6. A circuit according to claim 2 including at least $r$ conductors in one group and $p$ separate conductors in the other group.

7. A circuit according to claim 2 wherein said first plurality of rectifiers is divided into $r$ groups corresponding to each one of said input switching devices.

8. A circuit according to claim 7 wherein there are $q$ wires connecting each group of rectifiers to its corresponding input switching device.

9. A circuit according to claim 2 comprising at least equal to $q^r$ interconnecting means.

10. A circuit according to claim 2 comprising $$\frac{p!}{n!\,(p-n)!}$$

interconnecting means wherein $n$ is the number of the same type of units in each signal of said constant ratio code.

11. A circuit according to claim 2 wherein each said input switching device comprises a pair of contacts connected to said first plurality of rectifiers, a movable contactor operating between said contacts, resistances connected to each of said contacts, a one polarity energy source connected to each of said resistances, and another polarity energy source connected to said contactor.

12. A circuit according to claim 11 wherein said additional switching device comprises means for interrupting the connection from said energy source to said contactors.

13. A circuit according to claim 2 wherein the number of said additional switching devices equals $$\frac{p!}{n!(p-n)!} - q^r$$

wherein $n$ is the number of same type of units in each signal of said constant ratio code.

14. A circuit according to claim 2 wherein one group of said conductors comprises $r$ pairs of groups of conductors corresponding to each input switching device.

15. A circuit according to claim 2 wherein said first plurality of rectifiers comprises groups of rectifiers corresponding to each switching device equal to the number of unit combinations in said $r$ unit code.

16. A circuit according to claim 2 wherein said conductors and said plurality of interconnecting means comprise three matrices: one directly connected to said input switching devices, another directly connected to said output switching devices, and the third comprising at least part of said interconnecting means and interconnecting said other two matrices.

17. A circuit according to claim 2 wherein there are $qr$ rectifier groups in said first plurality of rectifiers and each of said groups includes $q^{(r-1)}$ rectifiers.

18. A circuit according to claim 2 wherein one of said codes has a plurality of different ratios of elements and wherein said interconnecting means pre-selects signals according to said different element ratio characteristics in said one code.

19. A circuit according to claim 2 wherein said first rectifiers oppose said second plurality of rectifiers through said interconnecting means.

20. A circuit according to claim 2 wherein said interconnecting means includes means for adding units to at least part of the signals of one of said codes to form the signals of the other code.

21. A circuit according to claim 20 wherein said means for adding said signals includes a gate circuit.

22. A circuit according to claim 21 wherein said gate circuit comprises a bi-stable trigger circuit.

23. A circuit according to claim 2 wherein at least some of said switching devices comprise electronic trigger circuits.

24. A circuit according to claim 23 wherein said trigger circuits each comprise a pair of electron discharge tubes and a pair of voltage dividers connected between the anodes and cathodes of each of said tubes, two of the outputs of each trigger being connected to a tap on two of said voltage dividers, and resistors of equal value for connecting said taps of all of said trigger circuits together through a common stabilizing conductor.

References Cited in the file of this patent

UNITED STATES PATENTS

| | | |
|---|---|---|
| 2,244,700 | Horton | June 10, 1941 |
| 2,348,016 | Michel | May 2, 1944 |
| 2,369,474 | Luhn | Feb. 13, 1945 |
| 2,473,444 | Rajchman | June 14, 1949 |
| 2,476,066 | Rochester | July 12, 1949 |
| 2,511,093 | Atwood et al. | June 13, 1950 |
| 2,517,102 | Flory | Aug. 1, 1950 |
| 2,519,172 | Brown | Aug. 15, 1950 |
| 2,524,134 | Palmer | Oct. 3, 1950 |
| 2,547,035 | McWhirter et al. | Apr. 3, 1951 |
| 2,564,403 | May | Apr. 3, 1951 |
| 2,557,729 | Eckert | June 19, 1951 |
| 2,570,716 | Rochester | Oct. 9, 1951 |
| 2,603,705 | Van Duuren | July 15, 1952 |
| 2,612,550 | Jacobi | Sept. 30, 1952 |
| 2,620,395 | Snijders | Dec. 2, 1952 |
| 2,633,491 | Zentgraf | Mar. 31, 1953 |
| 2,636,133 | Hussey | Apr. 21, 1953 |
| 2,657,318 | Rack | Oct. 27, 1953 |
| 2,657,856 | Edwards | Nov. 3, 1953 |
| 2,749,484 | Levitt | June 5, 1956 |
| 2,769,968 | Schultheis | Nov. 6, 1956 |

OTHER REFERENCES

"Radio Amateurs" Handbook, 1954 Edition, p. 252. Copy in Div. 42.

"Rectifier Networks for Multiposition Switching," by D. R. Brown and N. Rochester, Proceedings of IRE, February 1949, pp. 139 to 147.